(12) United States Patent
Chen

(10) Patent No.: US 11,836,804 B2
(45) Date of Patent: Dec. 5, 2023

(54) ANTI-FAKE PACKING METHOD FOR PRODUCT LIABILITY INSURANCE

(71) Applicant: HAINAN PAIPAIKAN INFORMATION TECHNOLOGY CO., LTD., Hainan (CN)

(72) Inventor: Mingfa Chen, Hainan (CN)

(73) Assignee: HAINAN PAIPAIKAN INFORMATION TECHNOLOGY CO., LTD., Hainan (CN)

(*) Notice: Subject to any disclaimer, the term of this patent is extended or adjusted under 35 U.S.C. 154(b) by 216 days.

(21) Appl. No.: 17/425,954

(22) PCT Filed: Dec. 26, 2019

(86) PCT No.: PCT/CN2019/128678
§ 371 (c)(1),
(2) Date: Jul. 27, 2021

(87) PCT Pub. No.: WO2020/151452
PCT Pub. Date: Jul. 30, 2020

(65) Prior Publication Data
US 2022/0198570 A1    Jun. 23, 2022

(30) Foreign Application Priority Data

Jan. 27, 2019  (CN) .......................... 201910076867.8
Jan. 30, 2019  (CN) .......................... 201910092297.1
(Continued)

(51) Int. Cl.
*G06Q 40/08* (2012.01)
*G06F 21/64* (2013.01)

(52) U.S. Cl.
CPC ............. *G06Q 40/08* (2013.01); *G06F 21/64* (2013.01); *G06Q 2220/145* (2013.01)

(58) Field of Classification Search
CPC ... G06Q 40/08; G06Q 2220/145; G06F 21/64
(Continued)

(56) References Cited

U.S. PATENT DOCUMENTS 6,623,041 B1    9/2003  Chen
2005/0283388 A1* 12/2005  Eberwine ............... G06Q 40/08
                                                        707/999.003
(Continued)

FOREIGN PATENT DOCUMENTS

CN    2216694 Y    1/1996
CN    2365711 Y    2/2000
(Continued)

OTHER PUBLICATIONS

Wenya Ding, Over 30% of Beijing's famous-brand bottled water is counterfeited, and the anti-counterfeiting Inquiry rate is low, Sep. 14, 2009, Chinanews, from Beijing Evening News.
(Continued)

*Primary Examiner* — Robert R Niquette
(74) *Attorney, Agent, or Firm* — Yue (Robert) Xu; Apex Attorneys at Law, LLP

(57) ABSTRACT

Disclosed is an anti-fake packing method for product liability insurance. The method comprises the following steps: providing an anti-fake electronic liability insurance policy for a product; performing coding to the insurance policy; attaching the code to an insurance policy identifier; disposing the identifier on the product; and correspondingly storing the electronic insurance policy, the anti-fake information and the insurance policy number into the database of an insurance policy claiming system. The consumer, when claiming the electronic insurance policy from the policy claiming system using smart phones, unknowingly identifies the genuineness of the insurance policy. According to the method, a high insurance policy claiming rate is transformed (Continued)

into a high anti-fake inspection rate, thereby improving the anti-fake strength and providing a beneficial technical effect desired by domestic and overseas researchers and developers of anti-fake technologies and insurance technologies.

17 Claims, 22 Drawing Sheets

(30) Foreign Application Priority Data

| Jun. 30, 2019 | (CN) | 201910581602.3 |
|---|---|---|
| Jul. 5, 2019 | (CN) | 201910601354.4 |
| Aug. 15, 2019 | (CN) | 201910752803.5 |
| Sep. 1, 2019 | (CN) | 201910820215.0 |

(58) Field of Classification Search
USPC .......................................................... 705/4
See application file for complete search history.

(56) References Cited

U.S. PATENT DOCUMENTS

| 2010/0036686 A1* | 2/2010 | Olivier | G06Q 40/08 |
|---|---|---|---|
| | | | 705/4 |
| 2011/0238451 A1* | 9/2011 | Bazzani | G06Q 40/00 |
| | | | 705/4 |
| 2022/0207615 A1* | 6/2022 | Naqvi | G06F 16/27 |

FOREIGN PATENT DOCUMENTS

| CN | 1074563 C | 11/2001 |
|---|---|---|
| CN | 102831528 A | 12/2012 |
| CN | 202939903 U | 5/2013 |
| CN | 203520457 U | 4/2014 |
| CN | 103886470 A | 6/2014 |
| CN | 103810603 B | 3/2015 |
| CN | 104794629 B | 4/2016 |
| CN | 106096970 A | 11/2016 |
| CN | 106960237 A | 7/2017 |
| CN | 107103346 A | 8/2017 |
| CN | 206431680 U | 8/2017 |
| CN | 107187725 A | 9/2017 |
| CN | 105416820 B | 12/2017 |
| CN | 109215493 A | 9/2019 |

OTHER PUBLICATIONS

Universal technical requirements of anti-counterfeiting technical products, published on Dec. 19, 2003, GB/T 19425-2003, AQSIQ of China.

International Search Report for PCT/CN2019/128678 dated Mar. 27, 2020, ISA/CN.

* cited by examiner

ANTI-FAKE PACKING METHOD FOR PRODUCT LIABILITY INSURANCE

The present application is the national phase of International Patent Application No. PCT/CN2019/128678, titled "ANTI-FAKE PACKING METHOD FOR PRODUCT LIABILITY INSURANCE", filed on Dec. 26, 2019, which claims the priorities to Chinese Patent Application No. 201910076867.8, titled "ANTI-FAKE METHOD FOR PRODUCT INSURANCE", filed on Jan. 27, 2019 with the Chinese Patent Office, Chinese Patent Application No. 201910092297.1, titled "ANTI-FAKE METHOD AND SYSTEM FOR INSURANCE OF GENUINE PRODUCT", filed on Jan. 30, 2019 with the Chinese Patent Office, Chinese Patent Application No. 201910581602.3, titled "FLYING INK ANTI-FAKE METHOD AND PRINTED MATTER", filed on Jun. 30, 2019 with the Chinese Patent Office, Chinese Patent Application No. 201910601354.4, titled "ANTI-FAKE METHOD USING NATURAL MICROPORE AND TWO DIMENSIONAL CODE", filed on Jul. 5, 2019 with the Chinese Patent Office, Chinese Patent Application No. 201910752803.5, titled "METHOD FOR VERIFICATION AND REDEMPTION WITHOUT COVERING", filed on Aug. 15, 2019 with the Chinese Patent Office, and Chinese Patent Application No. 201910820215.0, titled "METHOD FOR SETTING LIABILITY INSURANCE FOR GENUINE PRODUCT AND INQUIRY AND REGISTRATION SYSTEM", filed on Sep. 1, 2019 with the Chinese Patent Office, all of which are incorporated herein by reference in their entireties.

FIELD

The present disclosure relates to the technical field of product anti-fake and printing package, and in particular to a method for packaging a product with anti-counterfeiting liability insurance.

BACKGROUND

Chinese Patent Application grants a patent for "ENVIRONMENT PROTECTION AND ANTI-COUNTERFEITING PACKAGING METHOD BASED ON INTERNET OF THINGS (CN105416820B)". According to the method, the package is provided with a containing cavity for placing a product, an opening, and an intelligent lock. The intelligent lock is configured to control the opening to be opened. The intelligent lock exchanges data with a remote control terminal. The intelligent lock actively requests an authentication key (that is, anti-counterfeiting information) from the remote control terminal, performs authentication (that is, determines the matching of the anti-counterfeiting information) after receiving the authentication key, and opens the opening in a case that the authentication is successful.

In 1994, "PASSWORD ANTI-COUNTERFEITING IDENTIFIER (CN2216694Y)" is disclosed, where the password anti-counterfeiting is commonly known as code anti-counterfeiting or digital anti-counterfeiting. According to the disclosure, an anti-counterfeiting code is set for each of products, a unique random password (that is, an individual anti-counterfeiting feature) is hided in the anti-counterfeiting code, and the random password is recorded and stored in a database of an anti-counterfeiting identification system connected to internet as anti-counterfeiting information, that is, a basis for performing authenticity identification on a product. After purchasing a product attached with a code anti-counterfeiting identifier, the consumer makes a phone call and inputs the random password (that is, the anti-counterfeiting information) on the product, and then the consumer knows the authenticity of the product after the anti-counterfeiting identification system performs authenticity identification (that is, determining whether the uploaded anti-counterfeiting information matches the anti-counterfeiting information stored in the database). With this disclosure, the limitations that the conventional anti-counterfeiting products are easily counterfeited in batch and it is difficult for consumers to identify are broken. The code anti-counterfeiting is classified as an information identification anti-counterfeiting technology due to that the code anti-counterfeiting may be checked and verified by phone. After more than twenty years of popularization, the code anti-counterfeiting has been widely used in various products in various industries. The code anti-counterfeiting is recognized as a first generation of information identification anti-counterfeiting technology by the anti-counterfeiting industry in China, and is incorporated into national standard GB/T19425-2003. Since the random password (that is, the anti-counterfeiting information) is a cipher code and is checked after a product is purchased, the identification rate is very low. Based on statistics, an average identification rate is only 0.3%. Gradually, counterfeiters found technical loopholes of the code anti-counterfeiting. Thus, the code anti-counterfeiting has weak anti-counterfeiting strength and poor anti-counterfeiting effect.

In 1998, "ANTI-COUNTERFEITING METHOD BASED ON STRUCTURE AND TEXTURE (CN1074563C)" is disclosed, which belongs to information identification anti-counterfeiting technology. This disclosure is granted Chinese invention patent, American invention patent (U.S. Pat. No. 6,623,041), Russian invention patent (2202127), Korean invention patent (0419436), Vietnamese invention patent (3347) and other international patents. According to this disclosure, a material with random structure and clear texture is selected to make "a structure texture anti-counterfeiting identifier (CN2365711Y), a unique anti-counterfeiting code is printed, the random structure and texture (that is, an individual anti-counterfeiting feature) on the structure texture anti-counterfeiting identifier (CN2365711Y) is obtained by scanning and used as anti-counterfeiting information (that is, a basis for performing authenticity identification on a product), and the structure texture anti-counterfeiting identifier and the anti-counterfeiting code are recorded and stored in a database of a computer anti-counterfeiting identification system connected to internet. The public may check whether the random structure texture (that is, the anti-counterfeiting information) on the "structure texture anti-counterfeiting identifier" matches the anti-counterfeiting information recorded in the database based on an identification serial number by using communication tools such as a telephone, a short messaging service, a multimedia messaging service, a WeChat, a fax and a computer on connected to the internet, thereby performing authenticity. According to the disclosure, "the archaic tiger charm anti-counterfeiting principle is combined with modern communication technology and computer technology", and a new field of anti-counterfeiting is created. Thus, the method according to the disclosure is rated as the "world's first, internationally leading, extremely difficult to be forged, easy to be identified, and long-term effective" anti-counterfeiting technology in a national evaluation and appraisal meeting organized by "national anti-counterfeiting office" and China anti-counterfeiting industry association. In addition, the patent wins the first prize at the third China anti-counterfeiting industry association anti-counterfeiting technology. After more than 20 years of popularization, the anti-counterfeiting technology has become the leading technology in the domestic anti-counterfeiting market. The anti-counterfeiting technology is widely used. Since the authenticity of the product can be checked by telephoning, the anti-counterfeiting technology is classified as information identification anti-counterfeiting technology, and is recognized as a second generation of information identification anti-counterfeiting technology by anti-counterfeiting industry in China. Since the identifier and the anti-counterfeiting information are in plain text, the product can be identified before being purchased, and the identification rate is high. Based on statistics, the identification rate is 1.1%. Therefore, the anti-counterfeiting technology has strong anti-counterfeiting strength and good anti-counterfeiting effect.

In order to further improve the anti-counterfeiting identification rate and enhance the anti-counterfeiting strength, the above two generations of information identification anti-counterfeiting technology are successively improved and upgraded for dozens of times, and dozens of anti-counterfeiting technologies, such as "AUTOMATIC IDENTIFICATION SYSTEM FOR TEXTURE ANTI-COUNTERFEITING MOBILE PHONE BASED ON INTERNET OF THINGS (CN202939903U)", "HAND-TEAR TEXTURE ANTI-COUNTERFEITING METHOD AND PRODUCT AND MATERIALS THEREOF (CN109215493B)", "MOBILE PHONE IDENTIFICATION CODE SAW-TOOTH ANTI-COUNTERFEITING METHOD (CN104794629B)", "OVERLIMIT ANTI-COUNTERFEITING METHOD AND PRODUCT (CN106096970B)", "CODELESS ANTI-COUNTERFEITING METHOD (CN103810603B)", and "CLOTHES USER BIG DATA INTERFERENCE COLLECTION METHOD (CN107103346A)". The "MOBILE PHONE IDENTIFICATION CODE SAW-TOOTH ANTI-COUNTERFEITING METHOD (CN104794629B)" is evaluated by national anti-counterfeiting technology evaluation committee in October 2017 as the only information identification anti-counterfeiting technology with which "the anti-counterfeiting information (that is, a random saw-tooth) cannot be copied" in China. The anti-counterfeiting technology has broad application prospects. Since a product can be identified by telephoning, the anti-counterfeiting technology is classified as information identification anti-counterfeiting technology. The anti-counterfeiting technology is recognized as a third generation of information identification anti-counterfeiting technology by anti-counterfeiting industry in China. However, the upgraded technology in the promotion and practice still has low anti-counterfeiting identification rate and weak anti-counterfeiting strength.

China News Network (Sep. 15, 2009) published an article titled "XX anti-counterfeiting identification rate is low". According to the article, "consumers do not always identify the anti-counterfeiting code, counterfeiters recover a large number of anti-counterfeiting codes not being identified, counterfeit these anti-counterfeiting codes in batches, and paste the counterfeited anti-counterfeiting codes on the barrels water counterfeiting the brand, and statistics indicate that the identification rate of the anti-counterfeiting code is less than three in ten thousand". According to the article, the information identification anti-counterfeiting technology is in an embarrassing situation for a long time period. Enterprises have to use the information identification anti-counterfeiting technology. However, the anti-counterfeiting effect is weak due to two problems of low identification rate and inability of ensuring the authenticity of the authenticity subject cannot be solved by the information identification anti-counterfeiting technology. Due to the low identification rate, the anti-counterfeiting identification is useless, and the counterfeiters may easily counterfeit an anti-counterfeiting identification platform.

In summary, the first, second and third generation of information identification anti-counterfeiting technologies in China have the following three shortcomings.

1. Although there are thousands of anti-counterfeiting information identification systems in China, no unified and authoritative website and anti-counterfeiting APP that are memorized by consumers are provided. There are many counterfeit anti-counterfeiting identification system websites in the market, and it is difficult for consumers to determine the authenticity of anti-counterfeiting websites.

2. Consumers do not actively perform anti-counterfeiting identification, thus the identification rate is low, and a large number of anti-counterfeiting codes not identificated are left and recycled for counterfeiting.

3. The anti-counterfeiting strength is weak, and the anti-counterfeiting effect is poor. Many counterfeit products are not identified due to that the consumers do not perform anti-counterfeiting identification.

An insurance policy is a formal written proof of an insurance contract concluded between an insured and an insurance company. On the insurance policy, rights, obligations and responsibilities of both parties to the insurance contract are fully recorded. The content information (recorded) on the insurance policy is a basis for both parties to perform the insurance contract. An electronic insurance policy is issued by the insurance company for the insured using digital signature software and an enterprise digital certificate based on PKI system, and there is an electronic signature of the insurance company on the electronic insurance policy. The electronic insurance policy has the same legal effect as the paper insurance policy. The electronic insurance policy, after being printed in color, can be used as a paper insurance policy (that is, a printed insurance policy). In all the insurance companies, an insurance policy identification system is established, and functions of network identification and telephone identification are provided, thereby providing electronic insurance policy identification services.

A product liability insurance refers that in a case that the insured (that is, a policy holder) is required to be liable for personal injury or property loss of the third party caused by defects of products produced by the insured, the insurer (that is, the insurance company) is liable for compensation. According to the product liability insurance, in a case that the insured (that is, the policy holder such as a manufacturer and a distributor) is required to be liable for a personal injury, illness, death or property loss of any third party such as a user, a consumer and an operator, caused by an accident of the product or commodity produced or sold by the insured (that is, the policy holder, such as a manufacturer and a distributor) in an insured scope, the insurance company is responsible for the compensation within an agreed compensation limit.

Based on thirty years of research on the anti-counterfeiting technology and anti-counterfeiting theory, it is found that the anti-counterfeiting identification rate is very low only relying on consumers actively performing identification on the anti-counterfeiting information (that is, a basis of authenticity such as a personal anti-counterfeiting feature), it is easy counterfeit an anti-counterfeiting identification website, and thereby it is difficult to effectively curb the circulation of counterfeit products.

SUMMARY

A method for packaging a product with anti-counterfeiting liability insurance is provided according to the present disclosure to improve the anti-counterfeiting identification rate, enhance the anti-counterfeiting efforts, and reduce the number of fake anti-counterfeiting identification websites.

Following technical solutions are provided according to the method for packaging a product with anti-counterfeiting liability insurance according to the present disclosure.

A method for packaging a product with anti-counterfeiting liability insurance includes:

(1) providing (identity information of a third party such as an insurance beneficiary is to be determined (inactive)) an anti-counterfeiting liability electronic insurance policy (7) for the product (also called as a commodity);

(2) assigning an insurance policy number to the anti-counterfeiting liability electronic insurance policy (7), where an anti-counterfeiting liability electronic insurance policy (7) is assigned with at least one unique insurance policy number (10), and just as the public security departments assigns a unique resident identity number to each person, each electronic anti-counterfeiting liability insurance policy (7) is assigned a unique identity number, that is, the insurance policy number (10);

(3) arranging the insurance policy number (10) and anti-counterfeiting information on an insurance policy identifier (2) or arranging an anti-counterfeiting code (17) corresponding to the insurance policy number (10) and the anti-counterfeiting information corresponding to the insurance policy number (10) on the insurance policy identifier (2), which includes but not limited to printing the insurance policy number (10) in a form of two-dimensional code on the insurance policy identifier (2), writing the insurance policy number (10) in an insurance policy identifier (2) in a form of RFID, or writing an anti-counterfeiting code (17) corresponding to the insurance policy number (10) in the insurance policy identifier (2) in the form of RFID;

(4) packaging the product in a product package (1), and arranging the insurance policy identifier (2) on (or in) the product package (1), where the product (a group of products may be regarded as a product) is arranged with at least one insurance policy identifier (2), and the anti-counterfeiting liability electronic insurance policy (7) is associated with the product by using the insurance policy identifier (2) which includes associating the product with insurance policy content information (6) of the electronic anti-counterfeiting liability insurance policy (7) by using the insurance policy number (10)/anti-counterfeiting code (17) on the insurance policy identifier (2), and the insurance policy identifier (2) is arranged on the product to remind the consumer that an anti-counterfeiting liability insurance has purchased for the product and facilitate the consumer using a smartphone (5) to scan/read the insurance policy number (10) and log in to the insurance policy claim system to claim the electronic anti-counterfeiting liability insurance policy (7);

(5) integrating the insurance policy identifier (2) and the product package (1) into an inseparable whole to control the insurance policy identifier (2) not to be transferred to another product without damage, which indicates that if the insurance policy identifier (2) is separated forcibly from the product package (1), the insurance policy identifier (2) or the product package (1) is to be damaged and the insurance policy identifier (2) cannot be transferred to a counterfeit product;

(6) storing the anti-counterfeiting liability electronic insurance policy (7) (that is, the insurance policy content information (6)), the anti-counterfeiting information and the insurance policy number (10)/anti-counterfeiting code (17) in correspondence in a database (4) of an insurance policy claim system (by connecting to a computer in a mobile communication network) as filing information;

(7) uploading, by a claimant using the smartphone (5), an insurance policy number (10)/anti-counterfeiting code (17) and anti-counterfeiting information to the insurance policy claim system;

after performing authenticity identification (performing a first authenticity identification on the product), in a case that the uploaded insurance policy number (10) and anti-counterfeiting information match the filing information stored in the database (4), and the insurance policy claim system determines that the insurance policy identifier (2) is authentic, transmitting, by the insurance policy claim system, identification conclusion information (11) indicating that the insurance policy identifier (2) is authentic to the smartphone (5) of the claimant; and after performing authenticity identification, in a case that the uploaded insurance policy number (10)/anti-counterfeiting code (17) and anti-counterfeiting information do not match the filing information stored in the database (4), and the insurance policy claim system determines that the insurance policy identifier (2) is counterfeit, transmitting, by the insurance policy claim system, a warning message to the smartphone (5) to remind the claimant to beware of a counterfeit product; and (8) at the same time or after the insurance policy claim system transmits the identification conclusion information (11) indicating that the insurance policy identifier (2) is authentic to the smartphone (5), transmitting, by the insurance policy claim system, the anti-counterfeiting liability electronic insurance policy (7) (that is, the insurance policy content information (6)) corresponding to the determined insurance policy identifier (2) to the smartphone (5), activating, by the insurance policy claim system, the identity information of the third party such as the insurance beneficiary, receiving/confirming, by the insurance policy claim system, the identity information of the insurance beneficiary, and allowing, by the insurance policy claim system, the claimant to claim the anti-counterfeiting liability electronic insurance policy (7).

In this way, after the present disclosure applied to a product, in a case that the claimant receives identification conclusion information (11) indicating that the product is authentic and the product is finally determined as counterfeit by judicial evaluation, expert re-identification, or a designated independent third-party authenticity identification institute, the claimant may obtain an insurance claim as the insurance beneficiary. That is, after the anti-counterfeiting technical service according to the present disclosure provided by an anti-counterfeiting company applied to a product, in a case that the claimant receives identification conclusion information (11) indicating that the product is authentic and the product is finally determined as counterfeit by judicial evaluation, expert re-identification, or a designated independent third-party authenticity identification institute, the anti-counterfeiting company and the insurance company are liable for compensation for economic losses of the third part such as the consumer.

In this way, consumers who do not perform authenticity identification on the product cannot obtain the anti-counterfeiting liability electronic insurance policy (7) and thereby cannot obtain insurance claims. That is, the anti-counterfeiting liability electronic insurance policy (7) arranged on the product is an inactive insurance contract predetermined by a policyholder, and the insurance beneficiary is not determined. It is required for the consumer to claim the anti-counterfeiting liability electronic insurance policy (7) and fill in the identity information of the insurance beneficiary to activate the contract.

The anti-counterfeiting liability electronic insurance policy (7) is provided to protect rights and interests of consumers and prevent the consumers from being infringed by counterfeit products. Only after a product is purchased by the consumer, the consumer has the right to obtain the anti-counterfeiting liability electronic insurance policy (7) of the product. In order to prevent people who do not purchase the product from falsely claiming the anti-counterfeiting liability electronic insurance policy (7), to prevent people who have opportunity to come into contact with the product before the product is sold from falsely claiming the anti-counterfeiting liability electronic insurance policy (7), and to prevent a garbage collector who is not a real purchaser from falsely claiming the anti-counterfeiting liability electronic insurance policy (7), and to ensure that only the purchaser has the right to claim the anti-counterfeiting liability electronic insurance policy (7), a design for easily damaging an appearance structure such as package and identifier is provided. With the design, the purchaser/consumer may damage the package with bare hands and without any other tools, obtain and upload damage evidence (14) information of the appearance, and thereby determine whether the product has been purchased by the consumer. The following rule should be followed in claiming the anti-counterfeiting liability electronic insurance policy (7). The product having damaged package and appearance is deemed to have been purchased by the consumer, and the claimant has a right to fill in the insurance beneficiary as the identity information of the claimant to claim the anti-counterfeiting liability electronic insurance policy (7).

Preferably, an appearance structure damageable region (28) is arranged on the product package (1) or the insurance policy identifier (2). The appearance structure damageable region (28) includes but not limited to (that is, may include or may not include) a damageable cut line (3) die-cut at a position of 0 to 12 mm away from the insurance policy number (10) on the product package (1) or the insurance policy identifier (2) to facilitate the consumer damaging the appearance by tearing out the damageable cut line (3) and uploading damage evidence (14) information, a damageable pulling thread (9) embedded at a position of 0 to 12 mm away from the insurance policy number (10) on the product package (1) or the insurance policy identifier (2) to facilitate the consumer damaging the appearance by pulling up the pulling thread (9) and uploading damage evidence (14) information, an insurance policy number (10) printed at a position of 0 to 8 mm away from a mouth of a pop can to facilitate the consumer photographing and obtaining damage evidence (14) information such as the opened mouth of the pop can by using a smartphone (5), and an insurance policy number (10) printed at a position of 0 to 8 mm away from a straw socket (15) of a Tetra Pak to facilitate the consumer photographing and obtaining damage evidence (14) information such as a punctured straw socket (15) using a smartphone (5). In summary, the appearance structure damageable region (28) may include various damageable designs that are easy to be damaged by consumers and are difficult to be restored.

In order to ensure that only the purchaser has the right to claim the anti-counterfeiting liability electronic insurance policy (7), in addition to the design of the appearance structure damageable region (28), it is required for the insurance policy claim system to cooperate to perform authenticity identification. Preferably, the method for packaging a product with anti-counterfeiting liability insurance may further include one or a combination of the following technical solutions. It should be noted that the appearance structure damageable region (28) is arranged to facilitate the consumer (claimant) damaging the package with bare hands and without using an opening tool.

(1) When a claimant wants to claim the insurance policy, the clamant damages the appearance structure damageable region (28), and uploads damage evidence (14) information indicating that the appearance structure damageable region (28) is damaged to the insurance policy claim system by using the smartphone (5). In a case that the policy claim system determines that the uploaded damage evidence (14) is conclusive and is uploaded for the first time, the insurance policy claim system receives/confirms the identity information of the insurance beneficiary, and registers the anti-counterfeiting liability electronic insurance policy (7) under the received/confirmed identity information of the insurance beneficiary.

(2) After the insurance policy claim system determines that a RFID insurance policy identifier (2) is authentic, the clamant damages the RFID insurance policy identifier (2) to prevent other people from falsely claiming the anti-counterfeiting liability electronic insurance policy (7), then the insurance policy claim system registers the identity information last provided by the claimant as the insurance beneficiary.

(3) The claimant provides/confirms the identity information to the insurance policy claim system to claim the anti-counterfeiting liability electronic insurance policy (7). The insurance policy claim system receives/confirms the identity information provided by the applicant, and registers the identity information provided by the claimant as the insurance beneficiary.

(4) A printed anti-counterfeiting liability electronic insurance policy (7) on which the insurance policy number (10) is printed is arranged in the product package (1). The RFID insurance policy identifier (2) is arranged on the product package (1). The insurance policy number (10) is written in a RFID of the insurance policy identifier (2) on the product. Thus, the insurance policy number (10) printed on the printed anti-counterfeiting liability electronic insurance policy (7) is same as or correspond to the insurance policy number (10) written in a RFID chip. For example, an insurance policy number (10) printed on an anti-counterfeiting liability electronic insurance policy (7) in a wine box is same as or corresponds to an insurance policy number (10) written in a RFID chip in a bottle cap in the wine box.

(5) Preferably, the RFID insurance policy identifier (2) and a rubber cap in a bottle cap are pasted together. The insurance policy number (10) is hidden between the rubber cap (for example, a red rubber cap on a bottle cap of a bottle of a Guizhou Moutai wine) of the bottle cap and the bottle cap. After purchasing the product (for example, a bottle of a Guizhou Moutai wine), the consumer turns on an NFC function of the smartphone (5), moves the smartphone (5) close to a RFID bottle cap to obtain information stored in the chip, logs in to the insurance policy claim system, and removes the rubber cap to damage the RFID, scans the exposed insurance policy number (10), and fills in the insurance beneficiary as the claimant himself/herself.

(6) The claimant captures the insurance policy number (10) and the anti-counterfeiting information by using the smartphone (5), and uploads the captured insurance policy number (10) and anti-counterfeiting information (for example, a photomicrograph with a resolution greater than 1200*1200 dpi) to the insurance claim system to be stored as a history file in the database (4) of the insurance policy claim system for an insurance claim review or a judicial evaluation.

(7) The insurance policy claim system transmits insurance policy content information (6) of the anti-counterfeiting liability electronic insurance policy (7) corresponding to the insurance policy identifier (2) to the smartphone (5). The insurance policy content information (6) includes but not limited to the insurance policy number (10).

(8) Preferably, an appearance structure damageable region (28) is arranged on the product package (1) or the insurance policy identifier (2). The appearance structure damageable region (28) includes but not limited to (that is, may include or may not include) a damageable cut line (3) die-cut at a position of 0 to 12 mm away from the insurance policy number (10) on the product package (1) or the insurance policy identifier (2) to facilitate the consumer damaging the appearance by tearing out the damageable cut line (3) and uploading the damage evidence (14) information, a damageable pulling thread (9) embedded at the position of 0 to 12 mm away from the insurance policy number (10) on the product packaging matter (1) or the insurance policy identifier (2) to facilitate the consumer damaging the appearance by pulling up the pulling thread (9) and uploading the damage evidence (14) information, an insurance policy number (10) printed at a position of 0 to 8 mm away from a mouth of a pop can to facilitate the consumer using the smartphone (5) capturing the damage evidence (14) information such as the opened mouth of the pop can by using a smartphone (5), and an insurance policy number (10) printed at a position of 0 to 8 mm away from a straw socket (15) of a Tetra Pak to facilitate the consumer capturing the damage evidence (14) information such as a punctured straw socket (15) by using a smartphone (5).

In order to simplify production process and use process, and ensure that the insurance policy, the insurance policy identifier (2) and the authenticity identification process are organically combined and identified and interactive registration, the method for packaging a product with anti-counterfeiting liability insurance may further include one or more of the following technical solutions.

(1) The claimant captures a damaged appearance of the product to obtain the damage evidence (14) information by using the smartphone (5), uploads the obtained damage evidence (14) information in a form of image/video to the insurance policy claim system to be stored in the insurance policy claim system. After determining that the appearance of the product is damaged by performing analysis and comparison on the image/video, the insurance policy claim system changes the identity information of the insurance beneficiary of the anti-counterfeiting liability electronic insurance policy (7) from an undetermined state to a determined state.

(2) The appearance structure damageable region (28) is arranged on the product package (1) or on the insurance policy identifier (2). The insurance policy number (10) or the anti-counterfeiting code (17) corresponding to the insurance policy number (10) is arranged in the appearance structure damageable region (28). The clamant damages the appearance structure damageable region (28) with bare hands and keeps the insurance policy number (10) without damage. The clamant uploads the damage evidence (14) information indicating that the appearance structure damageable region (28) is damaged and the without damage insurance policy number (10) to the insurance policy claim system by using the smartphone (5).

(3) A magnification color rendering feature of a display screen (30) (that is, screen (30) feature information such as, a pixel array (29) based on three primary colors of red, green and blue) is stored and recorded as counterfeit feature information (that is, a special anti-counterfeiting information) in the database (4) of the insurance policy claim system. That is, the screen (30) feature information including but not limited to the feature information of a pixel array based on three primary colors of red, green and blue is stored and recorded as the counterfeit feature information (that is, a special anti-counterfeiting information) in the database (4) of the insurance policy claim system. The claimant photographs the damaged appearance of the product by using the smartphone (5) to obtain the damage evidence (14) information, uploads the obtained damage evidence (14) information in a form of image/video to the insurance policy claim system. The insurance policy claim system performs analysis and comparison on the image/video. In a case that the insurance policy claim system determines the uploaded image/video contains the screen (30) feature information, such as the pixel array (29) based on three primary colors of red, green and blue, the insurance policy claim system transmits a warning message to the smartphone (5) of the clamant to remind the claimant to beware of counterfeit and refuse the claimant to claim the anti-counterfeiting liability electronic insurance policy (7).

Based on research, the microscopic image/video, captured by using the smartphone (5) in a macro mode, of an object such as the insurance policy identifier (2) and the anti-counterfeiting label (18) does not contain the pixel array (29) based on three primary colors of red, green and blue, and the microscopic image/video is obviously different from a re-photographed screen (30) image. Therefore, with the method described above, the claimant is prevented from re-photographing an image (not an actual insurance policy identifier (2) or anti-counterfeiting label (18)) of the insurance policy identifier (2) or the anti-counterfeiting label (18) displayed on a mobile phone screen (30) or on a computer screen (30) or on other displays to forge damage evidence (14) information to falsely claim an anti-counterfeiting liability electronic insurance policy (7) and defraud an insurance claim.

(4) The claimant photographs the damaged appearance of the product using the smartphone (5) (such as an APP or a WeChat applet) to obtain the damage evidence (14) information, and uploads the obtained damage evidence (14) information to the insurance policy claim system. Images/videos included in an album of the smartphone (5) are forbidden to be added and used by the smartphone (50). Thus, the claimant is prevented from adding and using the forged damage evidence (14) information such as the image/video in the album of the smartphone (5), and thereby the claimant is prevented from falsely claiming the anti-counterfeiting liability electronic insurance policy (7) to defraud the insurance claim.

Preferably, an anti-counterfeiting label (18) with anti-counterfeiting code (17) is made. For example, the anti-counterfeiting label (18) may be made by using the over-limit anti-counterfeiting technology (CN106096970B) described in the background technology. The anti-counterfeiting label (18) is arranged in the product packaging matter (1). The anti-counterfeiting code (17) and the insurance policy number (10) are stored in one-to-one correspondence in the database (4) of the insurance policy claim system. After the clamant opens the product package (1) and find the anti-counterfeiting label (18), the clamant photographs (for example, take a ultra-clear photo or a short video) anti-counterfeiting information (for example, a distribution feature and width information of values) on the anti-counterfeiting label (18) using the smartphone (5) in a macro mode, or scans the anti-counterfeiting information on the anti-counterfeiting label (18) using a high-definition scanner. The clamant uploads the obtained anti-counterfeiting information having a high resolution (for example, a resolution greater than 1200*1200 dpi) to the database (4) of the insurance claim system for anti-counterfeiting identification to perform a second authenticity identification on the product. In a case that the insurance policy claim system determines that the anti-counterfeiting label (18) is authentic by performing the second identification, the insurance policy claim system registers the provided identity information as the insurance beneficiary. In a case that the insurance policy claim system determines that the anti-counterfeiting label (18) is counterfeit by performing the second authenticity identification, the insurance policy claim system transmits a notice to the claimant to prompt the claimant to start an insurance claim process and receive the insurance claim.

(5) Preferably, the anti-counterfeiting information and the damage evidence (14) are transmitted to an independent third party, that is, a re-identification system (31), to perform re-identification on the insurance policy identifier (2). In a case that the insurance policy identifier (2) indicated as an authentic insurance policy identifier (2) by the identification conclusion information (11) transmitted by the insurance policy claim system is determined as a counterfeit authentic insurance policy identifier (2) after re-identification, a re-identification conclusion is transmitted as a final identification conclusion to the smartphone (5), and an insurance claim process is started to provide an insurance claim for the claimant.

In this way, when purchasing a product, the customer may quickly claims the insurance policy identifier (2) using a smartphone with an ordinary resolution to obtain a first identification conclusion, thereby enhancing purchase confidence. After purchasing the product, especially in consuming (for example, in drinking a wine), the customer may open a package and find an anti-counterfeiting label (18) to perform a second authenticity identification on the product to claim an insurance policy, thereby enhancing consume confidence. In short, this step is designed for enhancing purchase confidence before purchasing and enhancing consume confidence after purchasing. The purposes of this design are as follows. The first authenticity identification is performed in a case that the consumer is shopping in a mall. In this case, there are many people waiting in line and time is limited, thus it is required to perform authenticity identification quickly and simply. The second authenticity identification is performed in a case that the consumer is consuming. In this case, time is sufficient and the consumer is leisurely, thus it is required to perform authenticity identification accurately. However, everything has two sides. If authenticity identification is performed simply and quickly, the identification conclusion may be inaccurate. That is, for the first authenticity identification, time is limited, and the identification conclusion may be inaccurate. To solve the above problem, the insurance policy identifier (2) is designed for the first authenticity identification that is performed in the case that the time is limited, the anti-counterfeiting label (18) is designed for the second authenticity identification that is performed in the case that the time is sufficient, and the re-identification system (31) that is operated by an independent third party and used for judicial evaluation is designed. The re-identification system (31) is operated independently by a third party, thus the re-identification system (31) has strong credibility, and the re-identification conclusion may be used as the judicial identification conclusion and may be used as a legal basis for the consumer to obtain the insurance claim.

Preferably, in a case that the insurance policy identifier (2) is determined to be authentic by the insurance policy claim system, the applicant pays insurance premiums online (for example, using WeChat payment) to purchase an insurance, and the insurance policy claim system registers the identity information provided by the claimant as the insurance beneficiary. Thus, an unclaimed product and a product that is determined as a counterfeit product are not to be provided with an anti-counterfeiting liability electronic insurance policy (7), and thereby insurance premiums are saved.

The insurance policy identifier (2) according to the present disclosure may be printed by using the first generation of information identification anti-counterfeiting technology in China, that is, the code anti-counterfeiting technology, may be printed by using the second generation of information identification anti-counterfeiting technology in China, that is, the vein anti-counterfeiting technology, may be printed by using the third generation of information identification anti-counterfeiting technology in China, that is, the saw-tooth anti-counterfeiting technology, may be made by using the RFID anti-counterfeiting technology, may be printed by using the information identification anti-counterfeiting technology of digital encryption anti-counterfeiting technology such as the self-encrypting two-dimensional code created by different companies.

The risk of the application of the method according to the present disclosure comes from the unreliability of the anti-counterfeiting technology. In a case that the insurance policy claim system fails to perform authenticity identification on the insurance policy identifier (2) to falsely determine a counterfeit insurance policy identifier (2) as an authentic counterfeit insurance policy identifier (2) and register the claimant as the insurance beneficiary, the insurer suffers huge economic losses. Currently, the third generation of information identification anti-counterfeiting technology in China, that is, the saw-tooth anti-counterfeiting technology (CN104794629B), is a most reliable choice.

In paragraphs [0019] and [0022] of the description of Chinese invention patent "MOBILE PHONE IDENTIFICATION CODE SAW-TOOTH ANTI-COUNTERFEITING METHOD (CN104794629B)" which is filed on May 15, 2015, it is required to use a high-end smartphone having a lens resolution greater than or equal to 8 million pixels to identify a large saw tooth with a size ranging from 0.3 mm(H)*0.3 mm(W) to 0.05 mm(H)*0.05 mm(W). There are two technical problems in applying the patent.

First, a small saw tooth cannot be identified by a low-end smartphone. Under a normal printing production condition, the average size of the saw tooth formed by ink infiltration is only 0.03 mm(H)*03 mm(W), thus the saw tooth is a small saw tooth. The average size of the small saw tooth is less than the minimum value of 0.05 mm (H)*0.05 mm(W) required by the "MOBILE PHONE IDENTIFICATION CODE SAW-TOOTH ANTI-COUNTERFEITING METHOD" (CN104794629B). Since most consumers use low-end smartphones with a front lens having a resolution less than 8 million pixels, the small saw tooth cannot be identified by the most consumers using low-end smartphones.

Second, it is difficult to produce a large saw tooth. To produce a large saw tooth that can be identified by the low-end smartphone, "LOCAL DIFFUSION-SAWTOOTH ANTI-FAKE PRINT (CN106960237B)" is developed, and an invention patent authorization is obtained. According to "LOCAL DIFFUSION-SAWTOOTH ANTI-FAKE PRINT (CN106960237B)", it is required to add a process, add a printing unit, and print a "diffusion (agent) coating" to control ink infiltration to form a large saw tooth, resulting in adding devices, adding processes, consuming diffusive agents, increasing production cost, and reducing production efficiency.

In summary, for applying the patent "MOBILE PHONE IDENTIFICATION CODE SAW-TOOTH ANTI-COUNTERFEITING METHOD (CN104794629B)", it is required to provide an technical solution with which it is easy to produce a saw tooth and the produced saw tooth is easy to be identified by the low-end smartphone, thereby overcoming the above two application technical problems and meeting the application requirements of the anti-counterfeiting technology according to the present disclosure.

To meet the strict application requirements of the anti-counterfeiting technology according to the present disclosure and reduce the economic risk of the insurer, the conventional anti-counterfeiting technology of "MOBILE PHONE IDENTIFICATION CODE SAW-TOOTH ANTI-COUNTERFEITING METHOD (CN104794629B)" is improved and perfected, and is applied in the present disclosure.

The method for packaging a product with anti-counterfeiting liability insurance described above in the present disclosure includes the following steps (1) to (5).

In step (1), some artificial micropores (19) are arranged on the insurance policy number (10).

In step (2), the insurance policy number (10) arranged with the artificial micropores (19) or a graphic (22) is printed on a printing surface of the insurance policy identifier (2) (having a surface energy of C) by using a liquid ink with a surface tension of Y C is not equal to Y, that is, C is greater than Y, or Y is greater than C, and C is not equal to or close to Y For example, a local diffusion (agent) coating having a surface energy (also called as surface tension) of C equal to 48 dyne/cm is printed in advance, and then the insurance policy number (10) or the graphic (22) is printed on the local diffusion (agent) coating by using a liquid ink with a surface tension of Y less than 24 dyne/cm. In short, the selected liquid ink should infiltrate or not infiltrate the printing surface, that is, the absolute value of the difference between C and Y should be large enough, and C should not be equal to or close to Y Thus the artificial micropores (19) printed with the liquid ink may naturally shrink/expand to randomly form saw-tooth micropores (20). After the printed artificial micropores (19) naturally shrink/expand to form random-shaped saw-tooth micropores (20), the ink is dried and solidified to shape the saw-tooth micropores (20). Diameters of some (that is, a part) of the saw-tooth micropores (20) range from 0.01 mm to 0.05 mm or range from 0.01 mm to 0.03 mm.

In step (3), the saw-tooth micropores (20) are photographed in a magnification mode to obtain micro-feature information of the saw-tooth micropores (20), and the obtained micro-feature information is stored and recorded as the anti-counterfeiting information in the database (4) of the insurance policy claim system.

In step (4), the saw-tooth micropores (20) are photographed by using a low-end smartphone (5) with a rear lens having a resolution equal to or greater than 5 million pixels to obtain the micro-feature information of the saw-tooth micropores (20), that is, the to-be-identified anti-counterfeiting information of the saw-tooth micropores (20).

In step (5), the obtained to-be-identified anti-counterfeiting information is matched with the anti-counterfeiting information file in the database (4); identification conclusion information (11) indicating that the insurance policy identifier (2) is authentic is displayed on the smartphone (5) in a case that the to-be-identified anti-counterfeiting information matches the anti-counterfeiting information file; and identification conclusion information (11) indicating that the insurance policy identifier (2) is counterfeit is displayed on the smartphone (5) in a case that the to-be-identified anti-counterfeiting information does not match the anti-counterfeiting information file.

Preferably, the method for packaging a product with anti-counterfeiting liability insurance includes drying and solidifying the ink after a delay of 0.15 seconds to 1.5 seconds for the artificial micropores (19) to fully shrink/expand and randomly deform after the insurance policy number (10) is printed.

Preferably, the method for packaging a product with anti-counterfeiting liability insurance includes arranging the saw-tooth micropores (20) in a position detection diagram (21) of a two-dimensional code, or arranging the saw-tooth micropores (20) in a text and graphic (22) at a center of the two-dimensional code, or arranging the saw-tooth micropores (20) in a text and graphic (22) beside the two-dimensional code.

Preferably, in the method for packaging a product with anti-counterfeiting liability insurance, shapes of the artificial micropores (19) includes one or more of a circle, a square, a triangle and a polygon, and hole widths of the artificial micropores (19) range from 0.06 mm to 0.36 mm or from 0.13 mm to 0.17 mm.

Preferably, the method for packaging a product with anti-counterfeiting liability insurance includes matching areas/perimeters of the saw-tooth micropores (20) with the anti-counterfeiting information stored in the database (4) to perform authenticity identification.

Compared with the conventional information identification anti-counterfeiting technology "MOBILE PHONE IDENTIFICATION CODE SAW-TOOTH ANTI-COUNTERFEITING METHOD (CN104794629B)", the insurance policy number (10) with the saw-tooth micropores (20) is used according to the present disclosures, thereby achieving the following beneficial technical effects.

First, it is easy for the low-end smartphone to identify the saw-tooth micropores (20). Based on research, in implementing the patent of "MOBILE PHONE IDENTIFICATION CODE SAW-TOOTH ANTI-COUNTERFEITING METHOD (CN104794629B)" in production, the average height H and the average width W of the saw teeth (23) growing along the edges of the insurance policy number (10) and the graphic (22) are only 0.03 mm*0.03 mm if the diffusion (agent) coating is not performed to promote growth. The saw-teeth (23) with average height and average width of 0.03 mm×0.03 mm are small saw-teeth (23), which cannot be captured by using the low-end smartphone with a rear lens having a resolution less than 8 million pixels. That is, the small saw-tooth (23) cannot be identified by the low-end smartphone.

As shown in FIG. 9, small saw teeth (23) connected end to end are formed along an edge of a saw tooth micropore (20). With this circle of saw teeth, the micropore (20) is a individual figure and has a direction, and the saw-tooth micropore (20) has an obvious individual feature.

The small saw teeth (20) is stored and identified as an anti-counterfeiting element in the background technology "MOBILE PHONE IDENTIFICATION CODE SAW-TOOTH ANTI-COUNTERFEITING METHOD (CN104794629B)". In the present disclosure, the saw-tooth micropore (20) enclosed by the small saw teeth (23) is stored and identified as an anti-counterfeiting symbol. Compared with the anti-counterfeiting element, the anti-counterfeiting symbol has much more individual information. It shows based on tests that, it is easier and more accurate to identify the saw-tooth micropores (20) that are used as the anti-counterfeiting symbol by using an algorithm model established by a convolution neural network and a self-learning technology than to identify the small saw teeth (23) that are used as the anti-counterfeiting element.

Based on research, the average size of saw-tooth micropores (20) is 0.15 mm, which is more than 5 times the height of the small saw teeth (23), where the height of the small saw teeth (23) is 0.03 mm. The shapes of saw-tooth micropores (20) are directional. Compared with the small saw teeth (23) as the anti-counterfeiting element, it is easy to capture the saw-tooth micropores (20) as the anti-counterfeiting symbol by using the low-end smartphone with the rear lens having a resolution lower than 5 million pixels. That is, the saw-tooth micropores (20) can be identified by the low-end smartphone.

Under the normal printing production condition, the average growth height H of the saw teeth (23) is 0.03 mm. The small saw tooth (6) with a height of 0.03 mm cannot be identified by the low-end smartphone with a front lens having a resolution less than 8 million pixels.

As shown in FIG. 9, under the normal printing production condition, in a case that the average growth height H of the small saw teeth (23) around the saw-tooth micropore (20) is 0.03 mm, the area of saw-tooth micropore (20) as the anti-counterfeiting symbol changes exponentially due to that multiple small saw teeth (23) diffusely grow from periphery of the saw-tooth micropore (20) to the center of saw-tooth micropore (20). That is, a small change in the small saw teeth (23) surrounding the saw-tooth micropore (20) causes a huge change in the area, shape and circumference of the saw-tooth micropore (20).

It shows based on tests that under the same condition, the accuracy of identifying the saw-tooth micropores (20) as the anti-counterfeiting symbol is 1 to 2 orders of magnitude higher than the accuracy of identifying the small saw teeth (23) as the anti-counterfeiting element, thereby greatly improving user experience. It further shows based on the tests that the saw-tooth micropores (20) as the anti-counterfeiting symbol can be accurately identified by using the low-end smartphone with a front lens having a resolution less than 5 million pixels. That is, the application technical problem that "small saw teeth cannot be identified by the low-end smartphone in the "MOBILE PHONE IDENTIFICATION CODE SAW-TOOTH ANTI-COUNTERFEITING METHOD (CN104794629B)" is solved by defining the insurance policy number (10) for the saw-tooth micropores (20).

It shows based on tests that, it is easy and accurate to perform anti-counterfeiting identification with the technical innovation of matching the area and circumference of the saw-tooth micropore (20) in the to-be-identified feature information with the anti-counterfeiting feature information file.

Second, big saw teeth are unnecessary and it is easy to perform production. Under a normal production condition, that is, under the same production condition, it is easier to identify the saw-tooth micropore (20) surrounded by small saw teeth (23) formed by ink diffusion (that is, infiltration) than to identify the small saw teeth (23) formed by ink diffusion. Therefore, it is unnecessary to print the "local diffusion (agent) coating" according to "LOCAL DIFFUSION-SAWTOOTH ANTI-FAKE PRINT (CN106960237A)". Thus, special devices are unnecessary, printing processes are reduced, diffusion agent is unnecessary, manufacturing cost is reduced, and production efficiency is improved. That is, it is unnecessary to produce the large saw tooth (23) required in "MOBILE PHONE IDENTIFICATION CODE SAW-TOOTH ANTI-COUNTERFEITING METHOD (CN104794629B)", thereby greatly reducing the manufacturing difficulty.

Third, non-reproducibility. The shape and size of the saw-tooth micropores (20) are formed by the artificial micropores (19) that shrink/expand naturally. The saw-tooth micropores (20) have random shapes and naturally excessive edge lines. It is almost impossible to artificially replicate the features of the shape and the natural transition. Moreover, after natural shrinkage, diameters of some saw-tooth micropores (20) are less than a printing limit width of 0.06 mm. These micro holes cannot be printed even with a most sophisticated commercial offset presses currently on the market. That is, since the most sophisticated commercial offset press on the market cannot print a line with a width less than 0.06 mm, the most sophisticated commercial offset press on the market cannot print and replicate the saw-tooth micropores (20) with diameters less than 0.05 mm. In addition, a small change in small saw teeth (23) surrounding a saw-tooth micropore (20) causes a huge change in the area and shape of the saw-tooth micropore (20), and it is easy for a small saw-tooth micropore (20) to disappear by being bridged due to that the diffusion/shrinkage of the ink infiltration is unavoidable and is difficult to be controlled, thus the difficulty of replicating and counterfeiting increases exponentially. Therefore, it is almost impossible for the counterfeiter to replicate successfully with the insurance policy number (10) arranged with saw-tooth micropores (20), thereby greatly reducing the economic risk of the insurer.

Fourth, the accuracy of anti-counterfeiting identification is improved by 1 to 2 orders of magnitude. It shows based on statistics that the accuracy of the anti-counterfeiting identification sub-system (12) using the technical solutions in the present disclosure to perform authenticity identification is above 99.99%. According to the evaluation of experts, the accuracy of the information identification anti-counterfeiting technology in China is improved by 1 to 2 orders of magnitude with the technical solutions according to the present disclosure, thereby achieving a major technological progress in the anti-counterfeiting industry. Therefore, with the insurance policy number (10) arranged with saw-tooth micropores (20), the application effect of "MOBILE PHONE IDENTIFICATION CODE SAW- TOOTH ANTI-COUNTERFEITING METHOD (CN104794629B)" is improved, and the public actively performs anti-counterfeiting identification, thereby greatly improving the anti-counterfeiting identification rate.

Fifth, the scope of application is broadened. According to the background technology of "MOBILE PHONE IDENTIFICATION CODE SAW-TOOTH ANTI-COUNTERFEITING METHOD (CN104794629B)", it is required to adopt the high-end smartphones with a rear lens having a resolution greater than 8 million pixels to perform authenticity identification. Using the insurance policy number (10) arranged with saw-tooth micropores (20), the authenticity identification can be performed by using the low-end smartphones with a rear lens having a resolution greater than 5 million pixels, thus the number of consumers using the method in the present disclosure increases greatly.

In order to meet the strict application requirements of the anti-counterfeiting technology according to the present disclosure and reduce the economic risk of the insurer, the conventional anti-counterfeiting technology is improved and perfected again, and is applied in the present disclosure.

First, a printing knowledge is introduced, that is, a printing limit width. The printing limit width refers to a width of a narrowest line that can be printed by a printer. Currently, the most sophisticated commercial offset printing presses on the market in China and abroad has a printing limit width greater than or equal to 0.06 mm. That is, points/lines with a width less than 0.06 mm cannot be printed even using a most sophisticated commercial printer on the market.

Inkjet printer is commonly referred to as jet printer. The jet printer has the following advantages. Since the printing material is not limited, the jet printer may print directly without the multiple repetitive processes, such as platemaking, film outputting, and color registering, in the conventional printing process. However, ink flying and cross color may occur in the printing process of the jet printer, which may seriously affect the printing quality. According to a user manual of the jet printer, the ink flying of the jet printer may be caused by the following five reasons.

A first reason is static electricity. In a case that the inkjet printer is in a dry environment with low humidity, it is easy to generate static electricity between a nozzle and material, resulting in the occurrence of flying ink in printing process.

A second reason is a voltage at the nozzle is too high. In a case that a nozzle board indicator light for displaying the voltage lights up in red to alarm, flying ink occurs in the printing process.

A third reason is that the nozzle has not been cleaned for a long time. In a case that the nozzle has not been cleaned after being used for a long time, line disconnection occurs, thereby resulting in flying ink.

A fourth reason is an abnormal frequency. In a case that a frequency of a pulse signal transmitted by an electronic control system is abnormal, a pulse distance between the nozzle ignitions is unreasonable, thereby resulting in flying ink.

A fifth reason is that the nozzle is arranged too high. Generally, a distance between the nozzle and the material is controlled between 0.5 mm and 1.5 mm. In a case that the nozzle is arranged to exceed a spraying range, flying ink definitely occurs.

For the above problems, following five solutions are provided.

First, for the flying ink due to the static electricity, it is required to arrange a static bar or a ground wire to shield the static electricity.

Second, for the flying ink due to the high voltage of the nozzle, it is required to modify a circuit board or change a circuit to avoid this problem.

Third, a test strip is printed to check the condition of the nozzle. In a case of blockage, deficiency and other conditions, it is required to clean a passage of the nozzle to keep the nozzle unobstructed. For the line disconnection, it is required to check the nozzle frequently to determine whether there is any deficiency or blockage. It is required to deal with immediately in a case of deficiency or blockage. If the deficiency or blockage is not dealt with immediately, ink flying is to occur.

Fourth, the problem of electronic control system is to be solved by special technicians.

Fifth, the problem that the distance between the nozzle and the material is too large is easily to be solved, and it is only required to shorten the distance between the nozzle and the material.

In summary, the phenomenon of flying ink is caused by the inkjet printer continuously operating in an abnormal operation condition. The size of the flying ink dot is random and small, and is much less than a minimum size 0.06 mm of an ink dot in normal printing.

The method for packaging a product with anti-counterfeiting liability insurance according to the present disclosure includes: (1) adjusting an operation parameter of an inkjet printer by increasing a voltage at a nozzle, raising the nozzle, applying static electricity, or changing a pulse signal frequency or performing other technical solutions to control the inkjet printer to operate in an abnormal operation state of flying ink in printing the insurance policy number (10) on the insurance policy identifier (2); (2) controlling the inkjet printer to operate in the abnormal operation state of flying ink to print the insurance policy number (10) on the insurance policy identifier (2) to generate flying ink dots (24) along with the printed insurance policy number (10); and photographing the flying ink dots (24) in the magnification mode to obtain micro-feature information of the flying ink dots (24), and storing the obtained micro-feature information as the anti-counterfeiting information in the database (4) of the insurance policy claim system, where the micro-feature information comprises at least one of a color, a shape, a size, a position, a direction, and the number of the flying ink dots (24).

Preferably, in the method for packaging a product with anti-counterfeiting liability insurance according to the present disclosure, diameters of some of the flying ink dots (24) are less than or equal to 0.05 mm, 0.04 mm, 0.03 mm, 0.02 mm or 0.01 mm. The smallest ink dot/the narrowest line that can be printed by the conventional printer is greater than the printing limit width of 0.06 mm. A size of a normal ink dot is greater than 0.06 mm. Thus the counterfeiter cannot counterfeit the flying ink dot (24) with a diameter less than 0.06 mm. That is, the size of the flying ink dot (24) counterfeited by the counterfeiter is greater than the printing limit width of 0.06 mm. By calculating the size of the counterfeited flying ink dot, the anti-counterfeiting identification sub-system (12) determines the flying ink dot product is a counterfeited flying ink dot. That is, since the flying ink dots (24) are generated non-artificially and randomly, some flying ink dots (24) with a diameter less than the printing limit width of 0.06 mm are generated.

Preferably, in the method for packaging a product with anti-counterfeiting liability insurance according to the present disclosure, some cracks are generated along with the printed insurance policy number (10). It shows based on research that some cracks are generated along with the printed insurance policy number (10) in printing by the inkjet printer in the abnormal operation state of flying ink.

Preferably, in the method for packaging a product with anti-counterfeiting liability insurance according to the present disclosure, a nozzle is raised to a distance of 1.6 mm to 3.6 mm from the insurance policy identifier (2).

Compared with the conventional technology, the insurance policy number (10) with the flying ink dots (24) and the cracks (25) has the following beneficial technical effects.

First, it is easy to produce. The inkjet printer is controlled to operate in an abnormal operation state of flying ink by increasing the voltage at the nozzle, raising the nozzle, applying static electricity, or changing a frequency of a pulse signal or performing other technical solutions, thus a non-reproducible anti-counterfeiting feature, that is, the flying ink dot (24), may be generated. The production process is simple.

Second, non-replicability. The size of the flying ink dot is random and small, and is much less than the minimum size 0.06 mm of an ink dot in normal printing. The minimum ink dot/the narrowest line that can be printed by the conventional printer is greater than the printing limit width of 0.06 mm. Therefore, the size of a flying ink dot (24) counterfeited by the counterfeiter is greater than 0.06 mm. After calculating the size of the counterfeited flying ink dot, the insurance claim system determines the flying ink dot is a counterfeited flying ink dot.

Third, according to the conventional printing technology standard, an insurance policy number (10) with flying ink dots (24) is defective or an unqualified. However, according to the technical standard of the present disclosure, the insurance policy number (10) with flying ink dots (24) is qualified, and an insurance policy number (10) without flying ink dots (24) is unqualified.

To meet the strict application requirements of the anti-counterfeiting technology according to the present disclosure and reduce the economic risk of the insurer, the conventional anti-counterfeiting technology is improved and perfected again, and is applied in the present disclosure.

The method for packaging a product with anti-counterfeiting liability insurance according to the present disclosure includes: (1) printing some ink dot (26) arrays on a printing surface of the insurance policy identifier (2) with ink, where the printing surface has wettability relative to the ink, and the ink dot (26) arrays are randomly scattered in blank gaps in the two-dimensional code, (2) randomly moistening the ink dot (26) arrays on the printing surface by an action of a wetting force to form infiltrating ink block (27) arrays with random shapes; and (3) photographing the infiltrating ink block (27) arrays in a magnification mode to obtain micro-feature information of an infiltrating ink block (27), and storing the obtained micro-feature information as the anti-counterfeiting information in the database (4) of the insurance policy claim system, where the micro-feature information includes one or more of a color, a shape, a size, a position, a direction and the number of infiltrating ink block (27).

Preferably, in the method for packaging a product with anti-counterfeiting liability insurance according to the present disclosure, a quotient obtained by dividing a width of the infiltrating ink block (27) by a width of a ink dot (26) ranges from 1.2 to 1.8; at least an array comprising 10 or 100 or 1000 or 3000 or 10000 ink dots (26) is printed on one insurance policy identifier (2); and the insurance policy claim system matches an average width, an average area, depths of colors, positions, or directions of infiltrating ink blocks (27) formed based on the ink dots (26) with an anti-counterfeiting information file to perform authenticity identification.

Thus, since the width of the infiltrating ink block (27) is greater than the width of one ink dot (26) and less than widths of two ink dots (26), the infiltrating ink block cannot be replicated. That is, the width of the infiltrating ink block (27) replicated by the non-infiltration ink dot (26) is an integral multiple of the width of the ink dot (26), and is not 1.2 to 1.8 times the width of the ink dot (26).

Thus, due to the large number of the infiltrating ink blocks (27) of the to-be-identified object, the feature, such as an average width and an average area, of the infiltrating ink blocks (27) changes (expands or shrinks) in performing high-definition replication to forge the to-be-identified object. Thus, the forged to-be-identified object is significantly different from the real to-be-identified object, and is to be identified by the anti-counterfeiting identification sub-system (12). That is, for each of the infiltrating ink blocks (27) in the replicated object, a small change in features (such as the average width, average area, and excessive color shades (for example, excessive changes in light and shade), for example, the width is reduced by 0.1 mm and is changed from 0.3 mm to 0.2 mm) causes a large change in the area (compared with the original size (such as at the width of 0.3 mm). The change in the area is expressed by the equation of 0.3 mm×0.3 mm−0.2 mm×0.2 mm=0.05 m2. Compared with the area of the original infiltrating ink block (27), the area is reduced by 55%. The value of the change is huge, and is detected by software easily. The value of the change is an average value of changes of the large number of infiltrating ink blocks (27), and thus the value of the change is accurate and reliable, and may be used as a basis for accurate identification conclusion. Based on statistics, it shows that the accuracy rate of performing authenticity identification based on this technical solution is above 9.999%. With the method according to the present disclosure, the accuracy of anti-counterfeiting identification in China is improved by two orders of magnitude, achieving a major technological progress in the anti-counterfeiting industry.

An (anti-counterfeiting liability) insurance policy claim system is provided according to the present disclosure.

An (anti-counterfeiting liability) insurance policy claim system includes an anti-counterfeiting identification sub-system (12) and an insurance policy registration sub-system (13). The insurance policy claim system includes: (1) an anti-counterfeiting liability electronic insurance policy (7) with undetermined identity information of an insurance beneficiary; (2) an insurance policy identifier (2) with an insurance policy number (10), where the insurance policy identifier (2) includes a two-dimensional code policy identifier (2) with an insurance policy number (10) in a form of two-dimensional code, or an RFID insurance policy identifier (2) with an insurance policy number (10) written into a chip, and the insurance policy identifier (2) is arranged on a product package (1), is combined with the product package (1) into an inseparable whole, and cannot be transferred to a counterfeit product without damage; (3) a database (4) in an insurance policy claim system configured to store anti-counterfeiting information and insurance policy content information (6) on the insurance policy identifier (2); (4) a server (8) for the insurance policy claim system configured to perform authenticity identification on the insurance policy identifier (2), transmit identification conclusion information (11) to a smartphone (5) of a claimant, receive identity information provided by the claimant, register the identity information provided by the claimant as an insurance beneficiary, and change identity information of the insurance beneficiary of the anti-counterfeiting liability electronic insurance policy (7) from an undetermined state to a determined state; and (5) a smartphone (5) configured to perform authenticity identification on the insurance policy identifier (2), receive the identification conclusion information (11) and the insurance policy content information (6) from the insurance policy claim system, provide the identity information of the insurance beneficiary, and upload damage evidence (14) information.

Preferably, the (anti-counterfeiting liability) insurance policy claim system includes at least one of the following features: (1) damage evidence (14) information verification unit, (2) an identity information determination unit, (3) an insurance beneficiary registration unit, and (4) an insurance premium revenue and expenditure unit. The damage evidence (14) information verification unit is configured to identify (such as, perform artificial intelligence identification or analysis on an image/video) damage evidence (14) information (such as, image/video/text) uploaded by a clamant to determine whether an appearance of a product is damaged. The identity information determination unit is configured to receive the identity information provided by the claimant. The insurance beneficiary registration unit is configured to register the identity information provided by the claimant as the insurance beneficiary, and change the identity information of the insurance beneficiary of the anti-counterfeiting liability electronic insurance policy (7) from an undetermined state to a determined state. The insurance premium revenue and expenditure unit is configured to collect insurance premium corresponding to the anti-counterfeiting liability electronic insurance policy (7).

Preferably, according to the (anti-counterfeiting liability) insurance policy claim system, a damageable cut line (3) is die-cut at a position of 0 to 12 mm away from the insurance policy number (10), or a damageable pulling thread (9) is embedded at the position of 0 to 12 mm away from the insurance policy number (10), or an insurance policy number (10) is printed at a position of 0 to 8 mm away from a mouth of a pop can, or an insurance policy number (10) is printed at a position of 0 to 8 mm away from a straw socket (15) of a Tetra Pak.

The insurance policy identifier (2) according to the present is a kind of a product package (1), that is, the insurance policy identifier (2) is one of thousands of product packages (1). The insurance policy identifier (2) may be arranged on a small self-adhesive label to be pasted on a large-size product package (1) such as a carton. The insurance policy identifier (2) may be directly printed on the large-size product package (1) such as the carton to be combined with the product package (1).

The anti-counterfeiting liability electronic insurance policy (7) according to the present disclosure includes an electronic version of a paper insurance policy.

The insurance policy number (10) according to the present disclosure is a serial number of an insurance contract, and is a unique identity number of the insurance contract. The insurance policy number (10) is preferably a character string including letters, numbers, underscores and other characters, and may be used as a link address.

The identity information according to the present disclosure includes default identity information. For example, in a case that the clamant logs in to the insurance policy claim system via a WeChat applet, a WeChat official account, or various registered APPs, the clamant provides identity information by default. The identity information described here generally refers to various IDs, such as an APP registration account, a telephone number, an e-mail address, a QQ number, a WeChat account, a bank account, with which a real identity of the claimant is associated.

According to the present disclosure, the anti-counterfeiting liability electronic insurance policy (7) may be claimed by clicking a favorite button in a WeChat applet, a WeChat account, or an APP, and may be claimed by automatically saving an inspection historical record.

The insurance beneficiary according to the present disclosure generally refers to a third person such as a purchaser, a user, a consumer, and an operator of a product.

Compared with the conventional technology, the following four beneficial technical effects may be achieved according to the present disclosure.

First, website counterfeiting is more difficult. Based on investigation, it is more difficult to counterfeit the insurance identification system platform than the anti-counterfeiting identification system platform. The reason is that the insurance company is a well-known large company, the domain name (for example, www.picc.com), APP, and the trademark of the WeChat applet of the insurance company are memorized by consumers. However, the anti-counterfeiting identification system platform is small and numerous, and is not familiar to the consumers. According to the present disclosure, The anti-counterfeiting identification sub-system (12) of the anti-counterfeiting company, the insurance policy registration sub-system (13) of the insurance company, and the re-identification system (13) of the independent third party with credibility perform anti-counterfeiting and authenticity identification on a product, forming an anti-counterfeiting system, an insurance system and a review system which interact with each other. Therefore, according to the present disclosure, it is more difficult to perform website counterfeiting, achieving the anti-counterfeiting advantage of unchangeable information based on blockchain technology.

Second, a claim rate of the insurance policy is transformed to an anti-counterfeiting identification rate. Subjectively, the consumer actively claims the insurance policy. Objectively, the consumer unconsciously and passively performs authenticity identification on the insurance policy identifier (2). Since the number of people claiming an insurance policy is much more than the number of people performing authenticity identification on the insurance policy, and the claim rate of the insurance policy is transformed into the anti-counterfeiting identification rate according to the present disclosure, thus the value of the claim rate of the insurance policy is equal to the value the anti-counterfeiting identification rate, the anti-counterfeiting identification rate according to the present disclosure is greatly improved, and the anti-counterfeiting identification rate of some valuable products even reaches more than 33%. Base on nearly 30 years of research on the anti-counterfeiting technology and the anti-counterfeiting theory, it is found that the anti-counterfeiting identification rate is very low relying on consumers actively performing authenticity identification on products, which is difficult to effectively curb product counterfeiting. According to the present disclosure, the anti-counterfeiting identification is implicitly performed in the process of consumers actively claiming the insurance policy, thus the anti-counterfeiting identification rate according to the present disclosure is improved by an order of magnitude.

Third, anti-counterfeiting strength is strong. Since the anti-counterfeiting identification rate is increased many times and even reaches more than 33%, the anti-counterfeiting effect is greatly increased, and the anti-counterfeiting strength is greatly enhanced. The outstanding technical effect is unexpected, and is wanted to be achieved by the research and development personnel of the anti-counterfeiting technology in China and abroad.

Fourth, the anti-counterfeiting liability is implemented. According to the conventional technology, after the anti-counterfeiting information identification anti-counterfeiting technology is applied on a product, in a case that the identification conclusion information (11) obtained by the consumer indicates that the product is authentic, and the consumer finally finds that the product is counterfeit, the anti-counterfeiting company that provides the anti-counterfeiting technical service is not liable for compensation. According to the present disclosure, the anti-counterfeiting liability electronic insurance policy (7) is a product liability insurance, and in a case that the identification conclusion information (11) obtained by the consumer indicates that the product is authentic, and the consumer finally finds that the product is counterfeit, the insurance company is liable for compensation. The conventional product liability insurance policy is not fixed on the product in one-to-one correspondence, is not integrated with the package of the product as an inseparable whole, is not coded, and is not provided with the insurance beneficiary registration technical system and the technical service. That is, according to the present disclosure, the anti-counterfeiting liability electronic insurance policy (7) is combined with the product package (1), to perform data interaction and authenticity identification, implementing the anti-counterfeiting liability, thereby enhancing the anti-counterfeiting strength.

Fifthly, new functions and new uses are achieved. Based on the electronic insurance policy, new functions and new uses of anti-counterfeiting technical services are provided for other products.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

Figure 1:
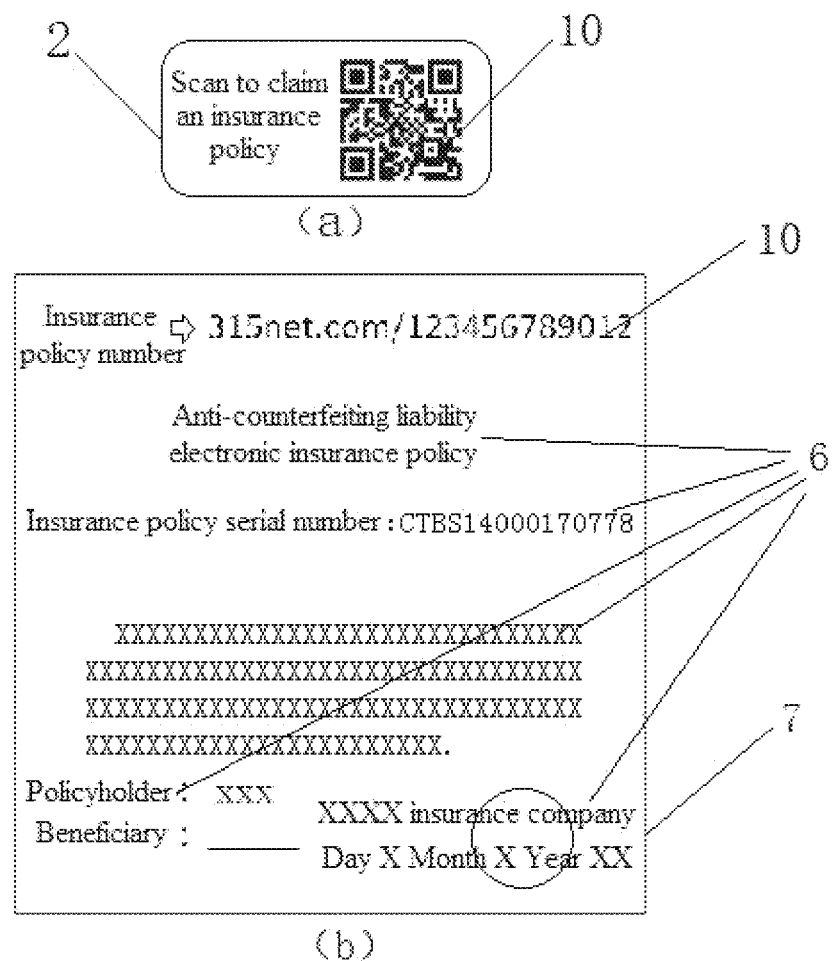
FIG. 1 is a schematic diagram showing an anti-counterfeiting liability electronic insurance policy (7) and an insurance policy identifier (2) according to a first embodiment of the present disclosure.

REFERENCE NUMERALS ARE LISTED AS FOLLOWS 1 product package
2 insurance policy identifier
3 (damageable) cut line
4 database
5 smartphone
6 insurance policy content information
7 anti-counterfeiting liability electronic insurance policy
8 server
9 unsealing pulling thread
10 insurance policy number
11 identification conclusion information
12 anti-counterfeiting identification sub-system
13 insurance policy registration sub-system
14 damage evidence
15 straw socket
16 WeChat applet two-dimensional code
17 anti-counterfeiting code
18 anti-counterfeiting label
19 artificial micropore
20 saw-tooth micropore
21 position detection diagram
22 graphic
23 saw tooth
24 flying ink dots
25 crack
26 ink dot
27 infiltrating ink block
28 appearance structure damageable region
29 pixel array based on three-primary colors of red, green and blue
30 screen
31 re-identification system

DETAILED DESCRIPTION OF THE EMBODIMENTS

First Embodiment

Figure 14:
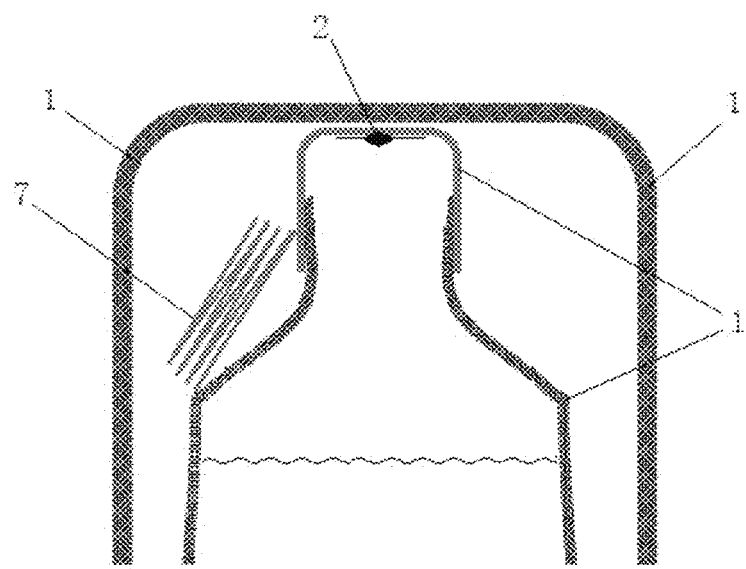
FIG. 14 is a schematic diagram of a wine product with an insurance policy number (10) written into a chip according to a seventh embodiment of the present disclosure.

As shown in FIGS. 1 and 14, insurance policy content information (6) of an electronic anti-counterfeiting liability insurance policy (7) with undetermined (that is, left blank) identity information of an insurance beneficiary is printed on a piece of offset A5 paper, as shown in FIG. 1b. Preferably, an insurance policy number (10) in a form of a link address including numbers and letters, an insurance policy serial number in a form of number, and the like may be printed on the paper. For example, the following content may be printed. The insurance company assures you that the product you purchased is authentic. If you have any doubt, you can perform a final judicial evaluation on the product through other third-party institutions with a judicial evaluation qualification. In a case that the product is determined as a counterfeit product after authenticity identification, you will receive an insurance compensation payment equal to three times the price of the product from the insurance company. Please scan the two-dimensional code on the product with your smartphone (5), log in to an insurance policy claim system, fill in identity information, and register the beneficiary of the insurance in your name.

The electronic anti-counterfeiting liability insurance policy (7) is assigned with a number. Each electronic anti-counterfeiting liability insurance policy (7) is printed with a unique insurance policy number (10).

The insurance policy number (10) in a form of two-dimensional code is printed on an insurance policy identifier (2) based on the anti-counterfeiting technology according to a Chinese patent of "MOBILE PHONE IDENTIFICATION CODE SAW-TOOTH ANTI-COUNTERFEITING METHOD (CN104794629B)", as shown in FIG. 1a.

The two-dimensional code on the insurance policy identifier (2) is photographed in a magnification mode to obtain saw teeth randomly distributed along the edge of the two-dimensional code printed in pink. The obtained random saw-tooth information is stored as anti-counterfeiting information in a database (4) of an anti-counterfeiting identification sub-system (12) shown in FIG. 5.

A printed anti-counterfeiting liability electronic insurance policy (7) is folded and then is placed in a wine box. The wine box is sealed by the insurance policy identifier (2) as a sealing sticker of the wine box to ensure that the person who does not purchase the wine product cannot take out the printed anti-counterfeiting liability electronic insurance policy (7) from the wine box. Thus, the printed anti-counterfeiting liability electronic insurance policy (7) is circulated with the wine product and provided to consumers.

Figure 2:
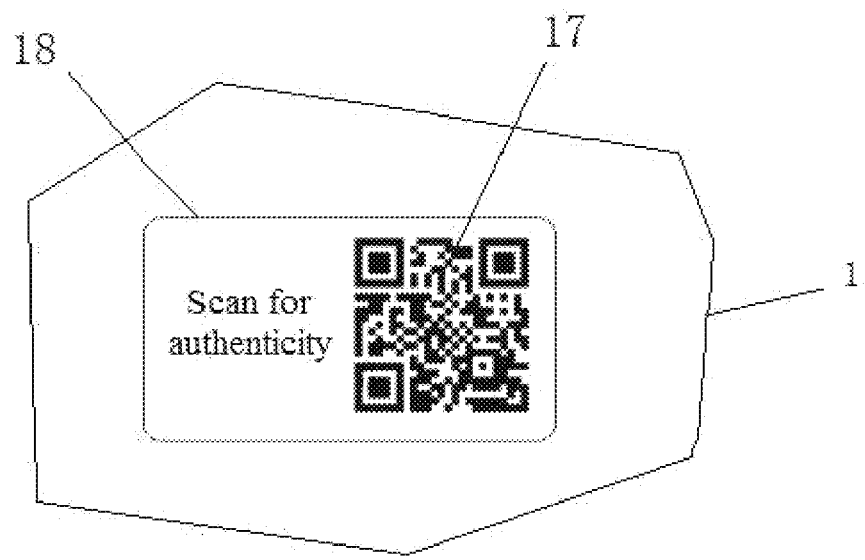
FIG. 2 is a schematic diagram of an anti-counterfeiting label (18) according to a first embodiment or a seventh embodiment of the present disclosure.

Preferably, an anti-counterfeiting label (18) with an anti-counterfeiting code (17) as shown in FIG. 2 is made by using the information identification anti-counterfeiting technology to seal the mouth of the bottle of the wine product. Preferably, the anti-counterfeiting code (17) and the insurance policy number (10) are stored in one-to-one correspondence in the database (4) of the insurance policy claim system. Preferably, the anti-counterfeiting code (17) and the insurance policy number (10) may be obtained based on a unified coding rule, or even the anti-counterfeiting code (17) and the insurance policy number (10) may be combined into one.

Figure 5:
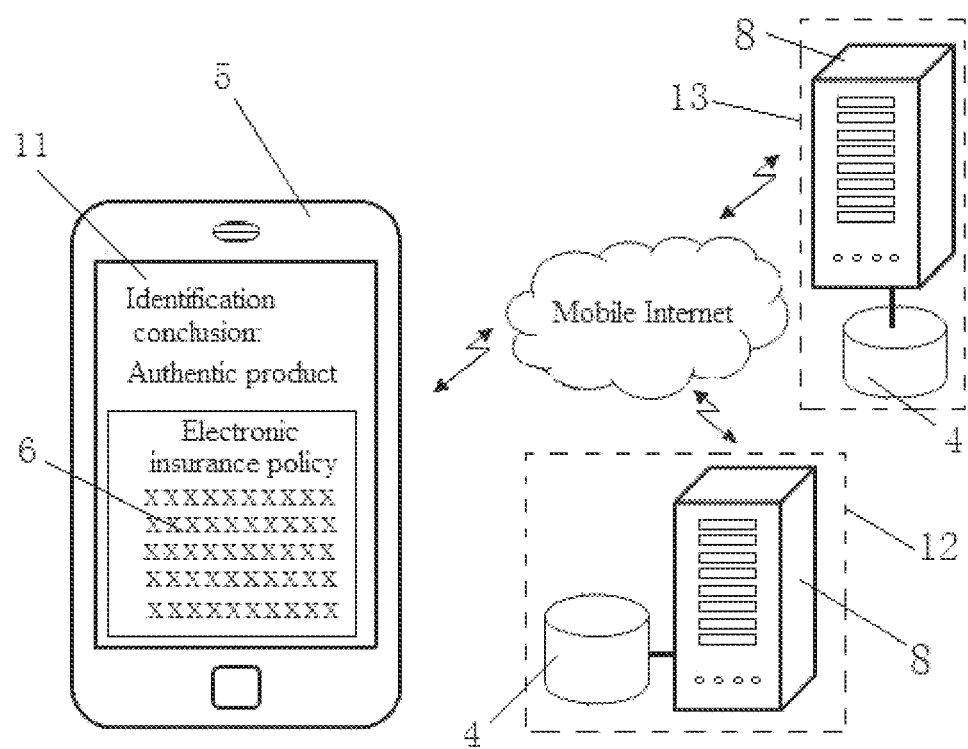
FIG. 5 is a schematic diagram of an insurance policy claim system according to a first or a second embodiment of the present disclosure.

An insurance policy claim system as shown in FIG. 5 is established. The system may include two parts of an anti-counterfeiting identification sub-system (12) and an insurance policy registration sub-system (13).

The insurance policy content information (6) of the anti-counterfeiting liability electronic insurance policy (7) and anti-counterfeiting information of the insurance policy identifier (2) are stored in one-to-one correspondence with the insurance policy number (10) in the database (4) of the insurance policy claim system.

In this way, before purchasing a wine product, the consumer may scan the insurance policy number (10) in the form of two-dimensional code on the sealing sticker of the wine box using the smartphone (5) to request for claiming the anti-counterfeiting liability electronic insurance policy (7). After performing authenticity identification (a first authenticity identification) on the product, in a case that the uploaded insurance policy number (10) and anti-counterfeiting information match the insurance policy number (10) and the anti-counterfeiting information stored in the database (4), the insurance policy claim system determines that the insurance policy identifier (2) is authentic, and transmits identification conclusion information (11) indicating that the insurance policy identifier (2) is authentic to the smartphone (5) to encourage the consumer to purchase the wine product with confidence. Alternatively, after performing authenticity identification, in a case that the uploaded insurance policy number (10) and anti-counterfeiting information do not match the insurance policy number (10) and the anti-counterfeiting information stored in the database (4), the insurance policy claim system determines that the insurance policy identifier (2) is counterfeit, and transmits warning information to the smartphone (5) to remind the claimant to beware of counterfeit and not to purchase the wine product.

After purchasing the wine product, the consumer, using the smartphone (5) according to requirements of prompt information to perform a second authenticity identification, may open the wine box (that is, damages the package), take out the anti-counterfeiting liability electronic insurance policy (7) from the wine box, and scan the insurance policy number (10) in the form of two-dimensional code on the anti-counterfeiting label (18) sealing the mouth of the bottle. After it is determined that the wine product is authentic, the consumer may log in to the insurance policy claim system to register identity information of the consumer as the insurance beneficiary. In this way, the consumer drinks and consumes with confidence.

Figure 4:
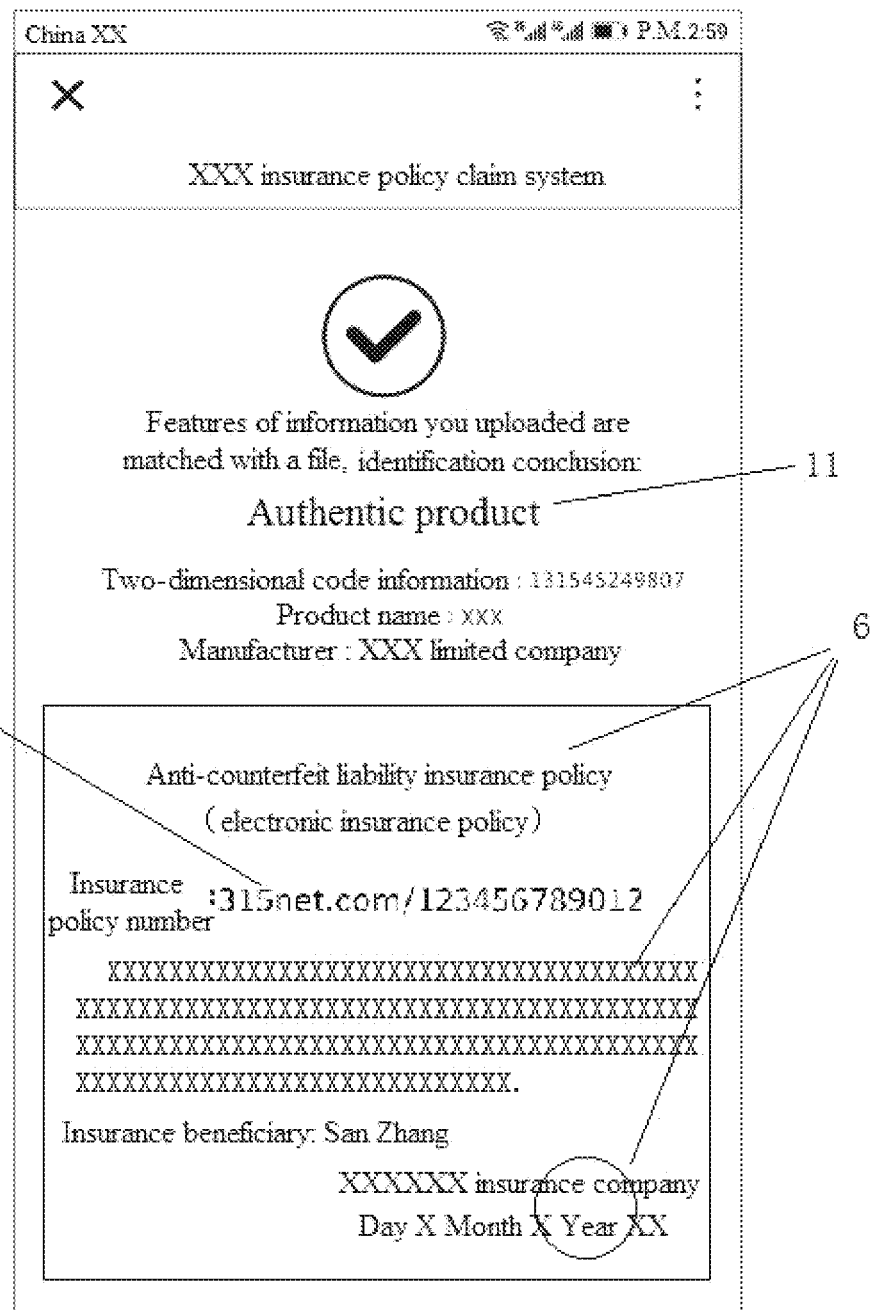
FIG. 4 is a schematic diagram of identification conclusion information (11) a displayed on a screen of a mobile phone according to a first embodiment or a second embodiment of the present disclosure.

Subjectively, the consumer actively scans the code to log in to the insurance policy claim system. Objectively, the consumer unconsciously and passively performs authenticity identification on the insurance policy identifier (2) using the insurance policy claim system. In a case that the insurance policy identifier (2) is authentic, the insurance policy claim system may transmit predetermined insurance policy content information (6) to the smartphone (5) of the claimant when or after transmitting the identification conclusion information (11) indicating that the anti-counterfeiting liability electronic insurance policy (7) is authentic to the smartphone (5) of the consumer. As shown in FIG. 4, for example, the following information may be transmitted. The insurance company assures you that the product you purchased is authentic. If you have any doubt, you can perform a judicial evaluation on the product through other third-party institutions with a judicial evaluation qualification. In case that the product is determined as a counterfeit product after authenticity identification, you will receive an insurance compensation payment equal to three times the price of the product from the insurance company.

In a case that the insurance policy identifier (2) is counterfeit, the insurance policy claim system transmits a warning message (for example, a warning message of "the product you are checking is a counterfeit insurance policy/product") to the smartphone (5) of the claimant to remind the claimant to beware of counterfeit.

In this way, in the case that the product is counterfeit, the claimant may obtain an insurance claim as the insurance beneficiary. That is, the consumer who does not perform authenticity identification on the product cannot obtain the anti-counterfeiting liability electronic insurance policy (7) and the insurance compensation.

Apparently, in a case that the consumer does not purchase the wine product and other products, the insurance policy claim system should not register the claimant as the insurance beneficiary of the anti-counterfeiting liability electronic insurance policy (7). Only after the consumer purchases the wine product, opens the wine box, and uploads the damage evidence (14) information, the insurance policy claim system may register the anti-counterfeiting liability electronic insurance policy (7) with undetermined identity information of the insurance beneficiary under the identity information provided (or confirmed) by the claimant, thus the anti-counterfeiting liability electronic insurance policy (7) is an anti-counterfeiting liability electronic insurance policy (7) with a determined insurance beneficiary (that is, the insurance beneficiary column is filled in).

Second Embodiment

Figure 3:
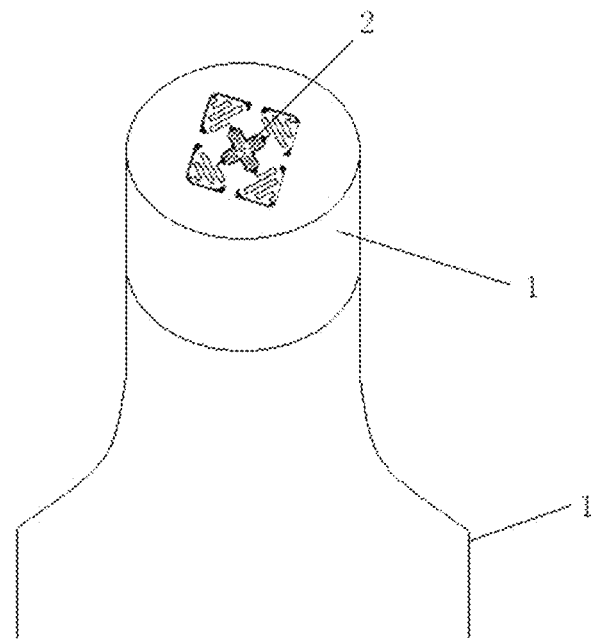
FIG. 3 is a schematic diagram of a RFID bottle cap with an insurance policy number (10) written into a chip according to a second embodiment of the present disclosure.

As shown in FIG. 3, an anti-counterfeiting liability electronic insurance policy (7) is assigned a unique insurance policy number (10). It is unnecessary to print the anti-counterfeiting liability electronic insurance policy (7). The insurance policy number (10) is written into a RFID chip to make a bottle cap pasted with a RFID insurance policy identifier (2). The bottle cap is an RFID bottle cap, is a part of the product package (1), and is integrated with the product package.

The insurance policy number (10) is encrypted and stored as anti-counterfeiting information in the database (7) of the anti-counterfeiting identification sub-system.

An insurance policy claim system as shown in FIG. 5 is established. The system may include an anti-counterfeiting identification sub-system (12) and an insurance policy registration sub-system (13).

The insurance policy content information (6) and the encrypted insurance policy number (10) used as the anti-counterfeiting information are stored in one-to-one correspondence in the database (4) of the insurance policy claim system.

In this way, after purchasing the wine product, the consumer may turn on an NFC function of the smartphone (5), move the smartphone close to the RFID bottle cap, open a linked page, obtain insurance policy content information (6) from the insurance policy claim system, fill in identity information, and register the identity information of the consumer as the insurance beneficiary.

Subjectively, the consumer actively reads the insurance policy content information (6) by using the NFC function of the smartphone (5), and logs in to the insurance policy claim system. Objectively, the consumer unconsciously and passively performs authenticity identification on the insurance policy identifier using the insurance policy claim system. In a case that the insurance policy identifier (2) is authentic, the insurance policy claim system may transmit predetermined insurance policy content information (6) to the smartphone (5) of the claimant when or after transmitting the identification conclusion information (11) indicating that the anti-counterfeiting liability electronic insurance policy (7) is authentic to the smartphone (5). As shown in FIG. 4, for example, the following information may be transmitted. The insurance company assures you that the product you purchased is authentic. You can perform a judicial evaluation on the product through other third-party institutions with a judicial evaluation qualification. In case of being determined as a counterfeit product after authenticity identification, you will receive an insurance compensation payment equal to three times the price of the product from the insurance company.

In a case that the product is authentic, the insurance policy claim system transmits a warning message (for example, a warning message of "the product you are checking is a counterfeit insurance policy/product") to the smartphone (5) to remind the claimant to beware of counterfeit.

In this way, in the case that the product is counterfeit, the claimant may obtain the insurance beneficiary as a third party such as the beneficiary of the insurance.

Apparently, in a case that the consumer does not purchase the wine product, the consumer has no right to unscrew the bottle cap, thus the RFID insurance policy identifier (2) in the bottle cap is not to be damaged. Other consumers may claim the anti-counterfeiting liability electronic insurance policy (7) and fill in the insurance beneficiary, and then the insurance policy claim system may register the identity information of the purchaser as the insurance beneficiary.

To prevent a person from pretending to be an insurance beneficiary, reminder information should be arranged at an obvious position on the wine box for prompting the consumer to first log in to the insurance policy claim system to register the identity information of the consumer as the insurance beneficiary, unscrew the bottle cap, damage the RFID insurance policy identifier (2) in the bottle cap. Thus, other person cannot read the RFID insurance policy identifier (2) and has no chance to log in to the insurance policy claim system to change the identity information of the insurance beneficiary, thereby the consumer keeping his/her identity information as the beneficiary of the insurance.

That is, the insurance policy claim system should determine the last provided identity information as the insurance beneficiary.

Third Embodiment

Figure 6:
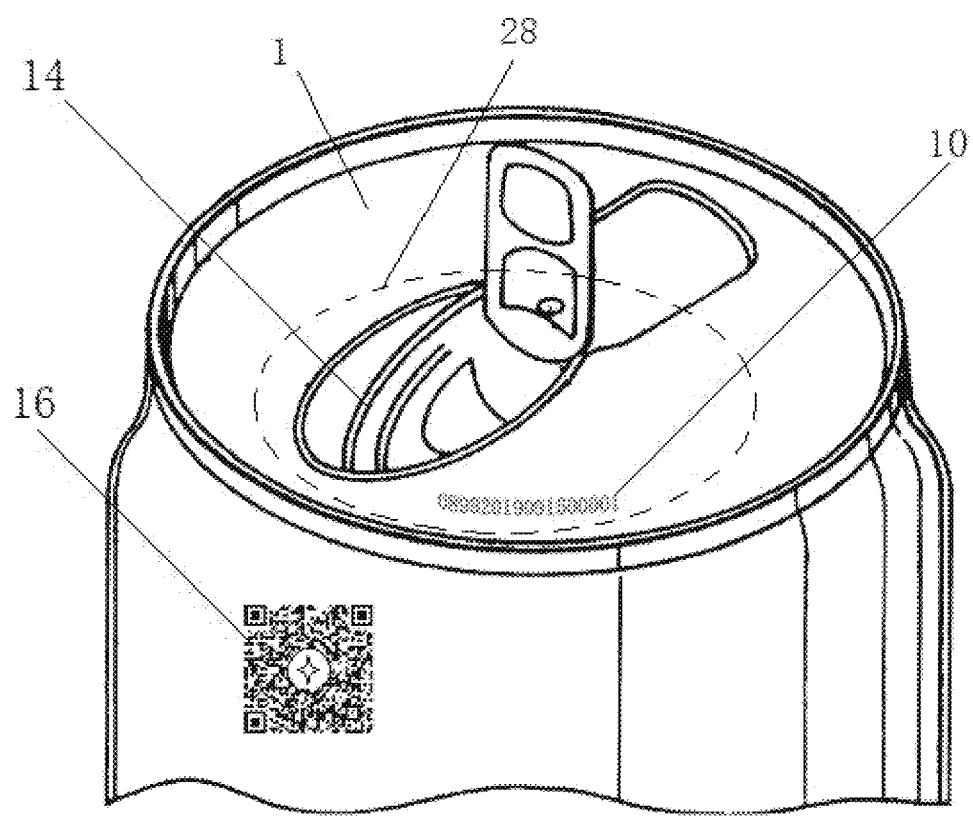
FIG. 6 is schematic diagram of a can with an insurance policy number (10) configured as Arabic numerals according to a third embodiment of the present disclosure.
Figure 7:
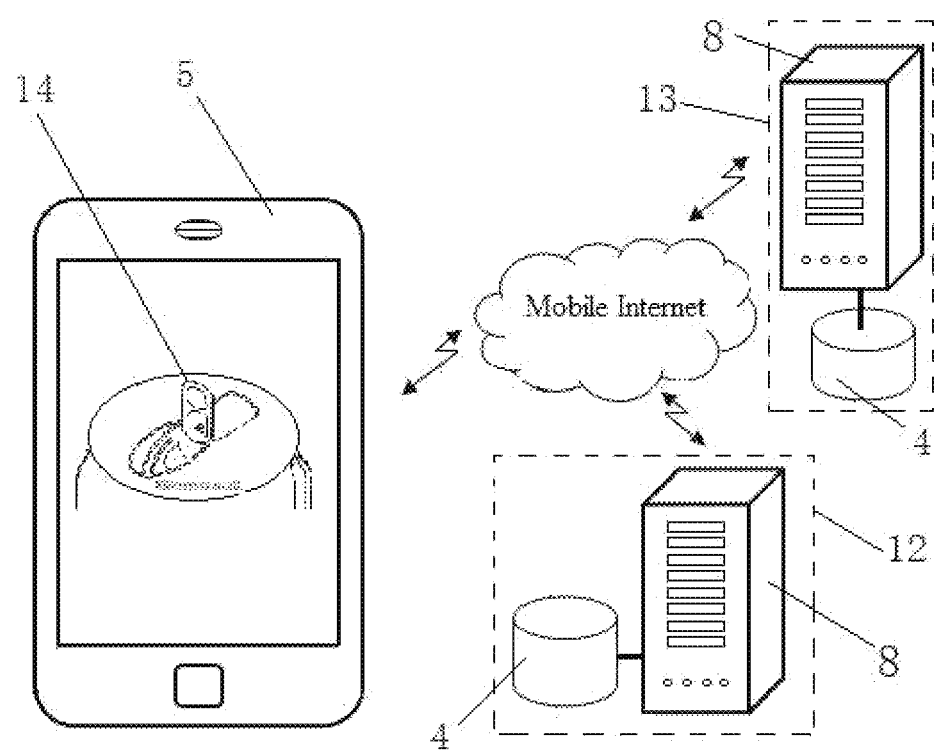
FIG. 7 is a schematic diagram of an insurance policy claim system according to a third embodiment of the present disclosure.

As shown in FIGS. 6 and 7, an insurance policy number (10) in Arabic numerals is spray-printed on a top cover of a can by using the anti-counterfeiting technology according to the Chinese patent of "MOBILE PHONE IDENTIFICATION CODE SAW-TOOTH ANTI-COUNTERFEITING METHOD (CN104794629B)". It is ensured that a can corresponds to an insurance policy number without repeating. A fixed two-dimensional code (16) of a WeChat applet is printed on a body of the can for logging in to the insurance policy claim system. For other steps, one may refer to the embodiments described above. Thus, after purchasing the can product, the consumer may pull up a tab to open the mouth of the can according to prompt information.

Then, the consumer may scan the two-dimensional code (16) of the WeChat applet printed on the body of the can by using a WeChat scanning software installed on the smartphone (5) to open the WeChat applet, photograph the insurance policy number (10) in Arabic numerals and the opened mouth to obtain damage evidence (14) information (such as, an image/short video) and the insurance policy number (10) information, and upload the obtained damage evidence (14) information and insurance policy number (10) information to the insurance policy claim system.

The insurance policy claim system receives and identifies the damage evidence (14) information and the insurance policy number (10) information.

The insurance policy claim system performs artificial intelligence image identification on the damage evidence (14) information. After it is determined that the mouth of the can is damaged and the insurance policy number (10) is authentic (the saw-tooth feature is matched) and valid, the provided identity information is registered as the insurance beneficiary according to the steps in the embodiments described above. That is, the anti-counterfeiting electronic liability insurance policy (7) is provided to the claimant for free.

Fourth Embodiment

Figure 8:
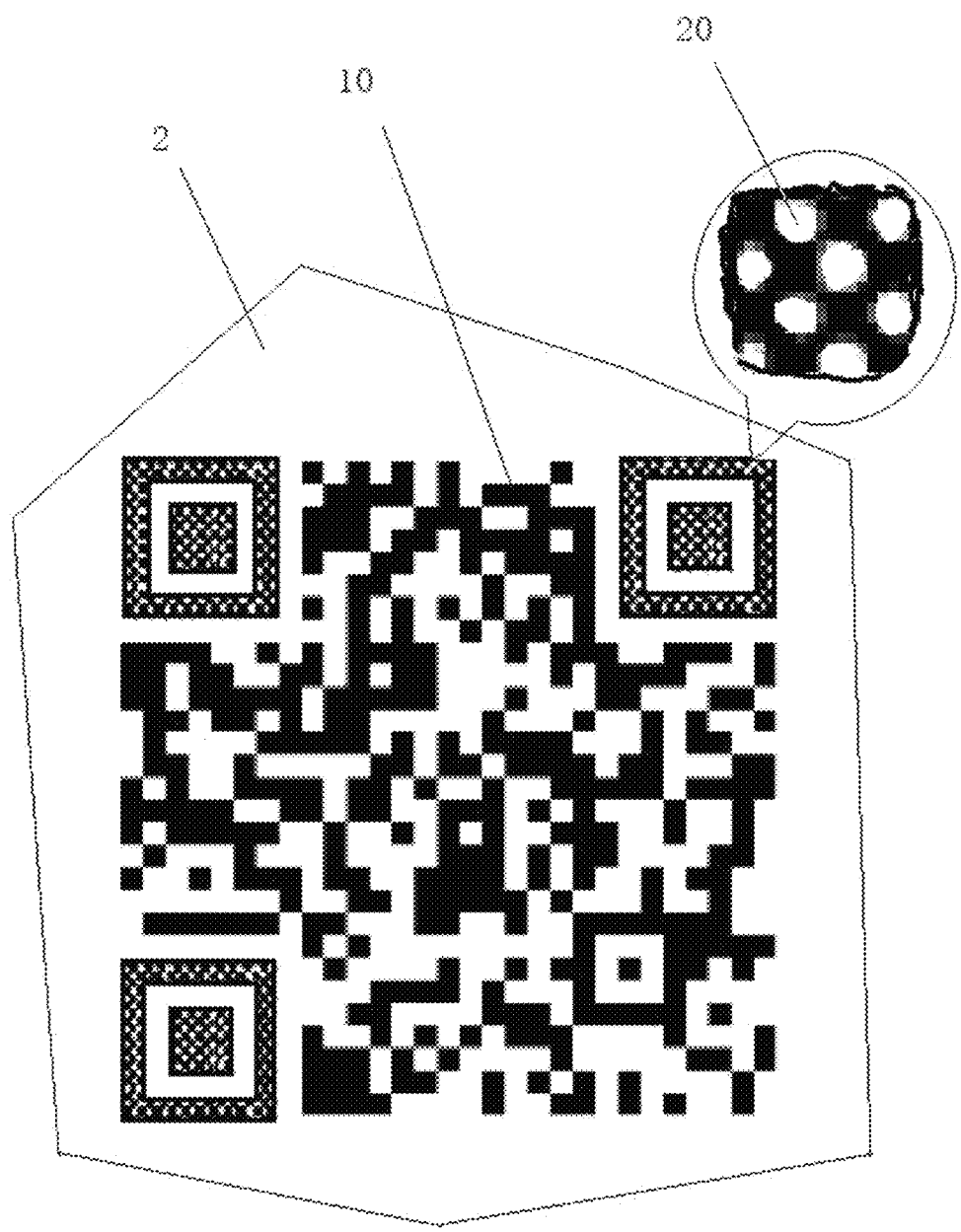
FIG. 8 is a schematic diagram of an insurance policy number (10) arranged with micropores according to a fourth embodiment of the present disclosure.

An insurance policy identifier (2) as shown in FIG. 8 is produced.

Each insurance policy identifier (2) is spray-printed with at least one unique insurance policy number (10).

Figure 9:
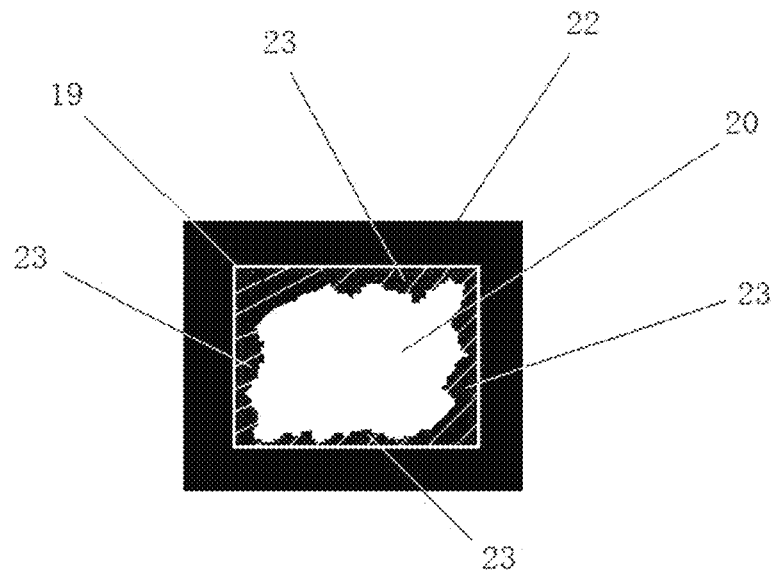
FIG. 9 is a schematic diagram of a micropore in FIG. 8 after being enlarged.

In step 1, a batch of electronic image files for unique insurance policy numbers (10) are generated in advance in the computer, and some square artificial micropores (19) with a width of 0.15 mm are arranged on each of the electronic images, as shown in FIG. 9. The artificial micropores (19) are arranged in a position detection diagram (21) of the two-dimensional code.

In step 2, the insurance policy number (10) with the square artificial micropores (19) is printed on a printing surface of the insurance policy identifier (2) with a surface energy of C by using liquid printing ink, such as UV inkjet ink, with a surface tension of Y, where C is greater than Y For example, a local infiltration coating with a surface energy C greater than 48 dyne/cm is printed in advance, and then the insurance policy number (10) is printed on the local infiltration coating by using liquid ink with a surface tension Y less than 24 dyne/cm. In short, the selected liquid ink should infiltrate the selected printing surface, that is, the difference between C and Y should be large enough, and C should not be equal to or close to Y Thus, the artificial micropores (19) enclosed by the liquid ink naturally contract and randomly deform under an action of a wetting force to form saw teeth (23), thereby forming saw-tooth micropores (20).

In step 3, after the insurance policy number (10) is printed and is kept for 0.15 seconds to 1.5 seconds for the artificial micropores (19) to fully shrink and randomly deform to form the saw-tooth micropores (20), the printing ink is dried. Diameters of some (that is, not all) of the saw-tooth micropores (20) are to be reduced to 0.01 mm to 0.05 mm.

In step 4, in production, the saw-tooth micropores (20) are photographed in a magnification mode to obtain microfeature information of the saw-tooth micropores (20). The micro-feature information includes at least one of a color, a shape, a size, an area, a perimeter, a position, a direction and the number of the saw-tooth micropores (20). The microfeature information is stored and recorded as the anticounterfeiting information in the database (4) of the insurance policy claim system to be used as an anti-counterfeiting information file.

In step 5, when claiming the anti-counterfeiting liability electronic insurance policy (7), the consumer photographs the saw-tooth micropores (20) on the insurance policy identifier (2) by using a smartphone (5) with a rear lens having a resolution equal to or greater than 5 million pixels to obtain the micro-feature information of the saw-tooth micropores (20), that is, to-be-determined anti-counterfeiting information.

In step 6, the insurance policy claim system matches the obtained to-be-identified anti-counterfeiting information (especially the diameter and shape) with the anti-counterfeiting information file. In a case that the to-be-identified anti-counterfeiting information matches the anti-counterfeiting information file, identification conclusion information (11) indicating that the insurance policy identifier (2) is authentic is displayed on the smartphone (5). In a case that the to-be-identified anti-counterfeiting information does not match the anti-counterfeiting information file, identification conclusion information (11) indicating that the insurance policy identifier (2) is counterfeit is displayed on the smartphone (5).

Thus, after purchasing a product, the consumer may scan the two-dimensional code on the product by using a WeChat scanning software installed on the smartphone (5) to open the WeChat applet, photograph the two-dimensional code and the damaged insurance policy identifier (2) by using the WeChat applet to obtain damage evidence (14) information (such as, an image/short video) and insurance policy number (10) information, and upload the obtained damage evidence (14) information and insurance policy number (10) information to the insurance policy claim system.

The insurance policy claim system receives and identifies the damage evidence (14) information and the insurance policy number (10) information.

The insurance policy claim system performs artificial intelligence image identification on the damage evidence (14) information. After it is determined that the insurance policy identifier (2) is damaged and the micro-feature information of the saw-tooth micropores (20) matches the anti-counterfeiting information file, the provided identity information is registered as the insurance beneficiary according to the steps in the embodiments described above. That is, the anti-counterfeiting liability electronic insurance policy (7) is provided to the claimant for free.

Fifth Embodiment

Figure 10:
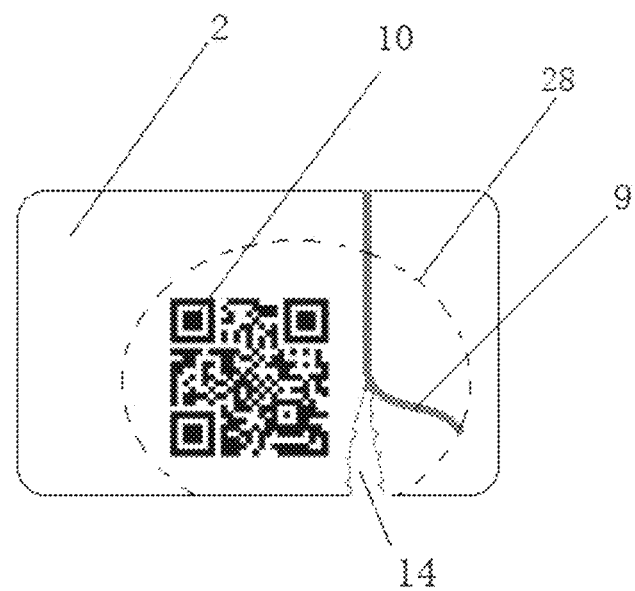
FIG. 10 is a schematic diagram of a damaged insurance policy identifier (2) with an insurance policy number (10) configured in a form of two-dimensional code according to a fifth embodiment of the present disclosure.
Figure 11:
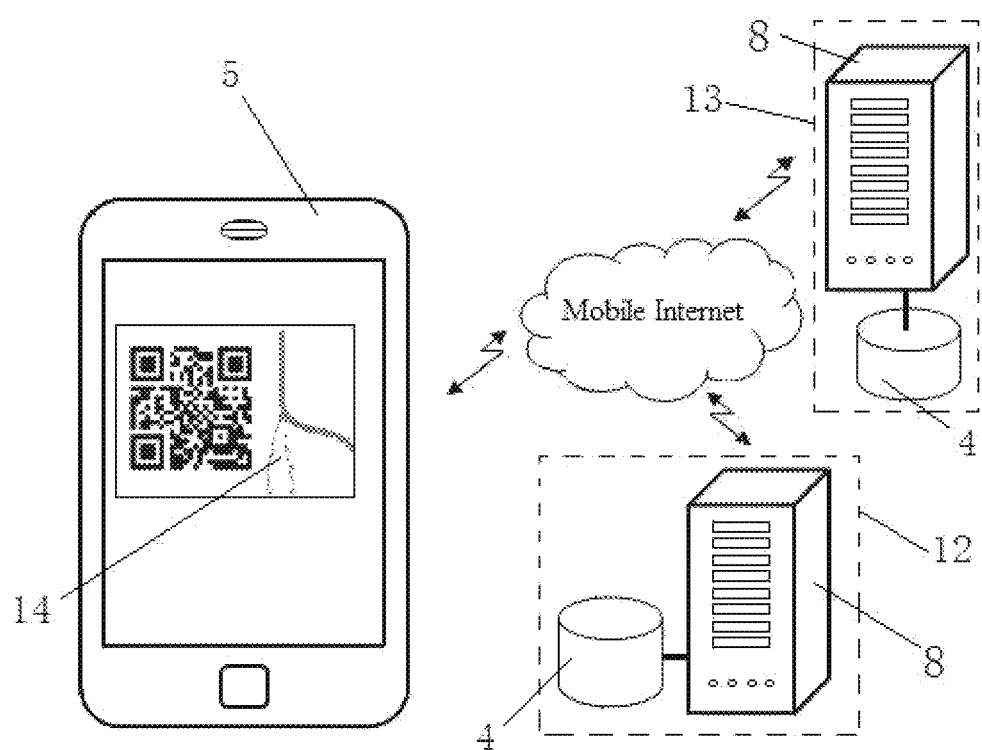
FIG. 11 is a schematic diagram of an insurance policy claim system according to a fifth embodiment of the present disclosure.

As shown in FIGS. 10 and 11, the insurance policy identifier (2) is printed on a coated paper self-adhesive material. A thin thread, for example, a texture line string according to a patent having an authorization publication number of CN109215493B, is arranged on a back side of a self-adhesive layer to be used as an unsealing pulling thread (9). Preferably, a thread end, that may be pinched and pulled up easily by hand, is arranged.

A unique insurance policy number (10) in the form of two-dimensional code is printed on the front side of the insurance policy identifier (2). For example, a link address of http://315net.com/123456789012 is printed as the insurance policy number (10).

According to the Chinese patent of "MOBILE PHONE IDENTIFICATION CODE SAW-TOOTH ANTI-COUNTERFEITING METHOD (CN104794629B)", the two-dimensional code is photographed in a macro mode to obtain individual feature information, such as the random saw teeth distributed along the edge of the two-dimensional code, and the individual feature information, such as the random saw teeth, is stored as the anti-counterfeiting information in the database (4).

The insurance policy identifier (2) is firmly pasted on the product package (1), so that the insurance policy identifier (2) cannot be transferred to a counterfeit product without damage.

Thus, after purchasing the product, the consumer may pinch the thread end and pull up the pulling thread (9) to tear up the label according to prompt information.

Then, the consumer may scan the two-dimensional code on the product by using the WeChat scanning software installed on the smartphone (5) to open the WeChat applet, photograph the two-dimensional code and the damaged insurance policy identifier (2) by using the WeChat applet to obtain damage evidence (14) information and insurance policy number (10) information (such as, an image/short video), and upload the obtained damage evidence (14) information and insurance policy number (10) information to the insurance policy claim system.

The insurance policy claim system receives and identifies the damage evidence (14) information and the insurance policy number (10) information.

The insurance policy claim system performs the artificial intelligence image identification on the damage evidence (14) information. After it is determined that the insurance policy identifier (2) is damaged and the feature of the saw teeth matches the anti-counterfeiting information file, the provided identity information is registered as the insurance beneficiary according to the steps in the embodiments described above. That is, the anti-counterfeiting liability electronic insurance policy (7) is provided to the claimant for free.

Sixth Embodiment

Figure 12:
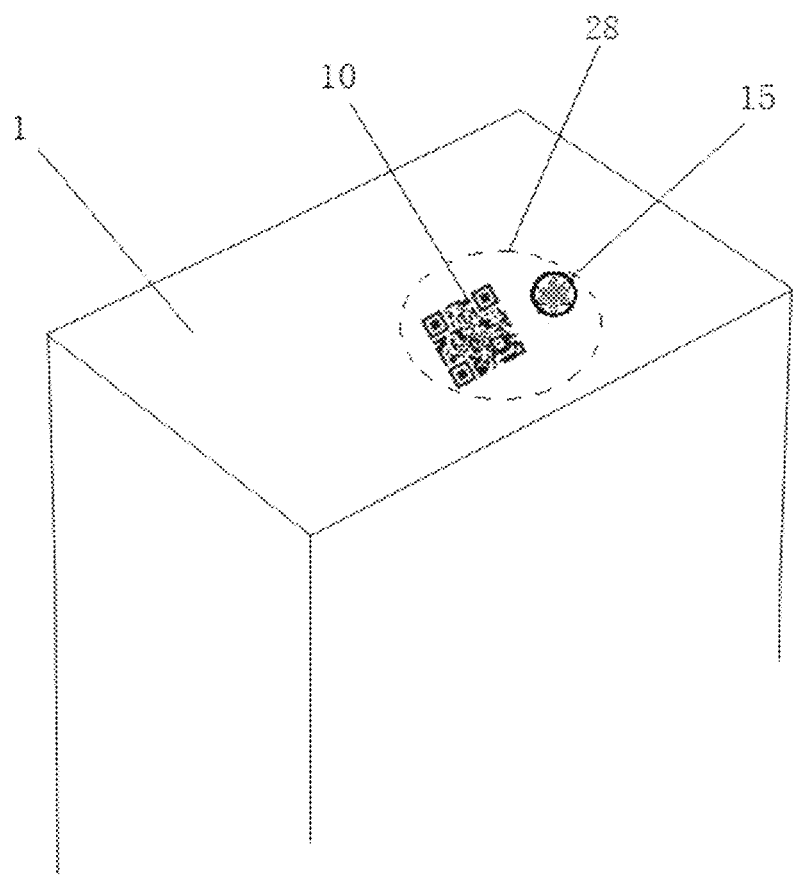
FIG. 12 is a schematic diagram of a Tetra Pak (being opened) with an insurance policy number (10) configured in a form of two-dimensional code according to a sixth embodiment of the present disclosure.
Figure 13:
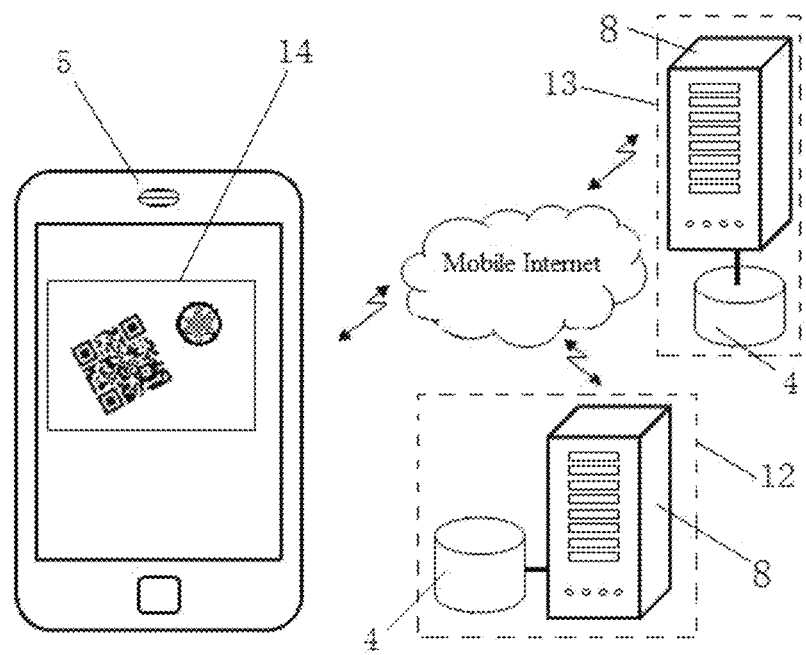
FIG. 13 is a schematic diagram of an insurance policy claim system according to a sixth embodiment of the present disclosure.

As shown in FIGS. 12 and 13, according to the Chinese patent of "MOBILE PHONE IDENTIFICATION CODE SAW-TOOTH ANTI-COUNTERFEITING METHOD (CN104794629B)", an insurance policy number (10) in the form of two-dimensional code is printed at a position beside a straw socket (15) on the top of a Tetra Pak. It is ensured that a Tetra Pak corresponds to an insurance policy number without repeating. For other steps, one may refer to the embodiments described above. Thus, after purchasing a Tetra Pak (such as, milk), the consumer may pierce the straw socket (15) to damage the package according to prompt information.

Then, the consumer may scan the two-dimensional code on the Tetra Pak by using the WeChat scanning software installed on the smartphone (5) to open the WeChat applet, photograph the two-dimensional code and the pierced straw socket (15) by using the WeChat applet to obtain damage evidence (14) information (such as, an image/short video) and insurance policy number (10) information, and upload the obtained damage evidence (14) information and insurance policy number (10) information to the insurance policy claim system.

The insurance policy claim system receives and identifies the damage evidence (14) information and the insurance policy number (10) information.

The insurance policy claim system performs the artificial intelligence image identification on the damage evidence (14) information. After it is determined that the product package (1) is damaged (for example, a pierced straw socket (15) is found next to the two-dimensional code) and the insurance policy number (10) is authentic (not counterfeit) and valid, the provided identity information is registered as the insurance beneficiary. That is, the anti-counterfeiting liability electronic insurance policy (7) is provided to the claimant for free.

Seventh Embodiment

As shown in FIGS. 1, 2, 3 and 14, each anti-counterfeiting liability electronic insurance policy (7) is assigned a unique insurance policy number (10). The insurance policy content information (6) of the anti-counterfeiting liability electronic insurance policy (7) with undetermined (that is, left blank) identity information of the insurance beneficiary is printed on a piece of offset A5 paper. The insurance policy number (10) in a form of two-dimensional code, an insurance policy serial number in numbers and the like are printed on the paper. The printed anti-counterfeiting liability electronic insurance policy (7) is folded and then is placed in a wine box.

The insurance policy number (10) is written into a RFID chip. A bottle cap with a built-in RFID insurance policy identifier (2) is produced. The bottle cap is an RFID bottle cap, is a part of the product package (1), and is integrated with the product package.

The insurance policy number (10) written into the RFID chip is encrypted and stored as anti-counterfeiting information in the database (7) of the anti-counterfeiting identification sub-system (12). It is ensured that the insurance policy number (10) printed on the anti-counterfeiting liability electronic insurance policy (7) in a wine box is the same as or corresponds to an insurance policy number (10) written in the RFID chip in the bottle cap in the wine box.

Figure 16:
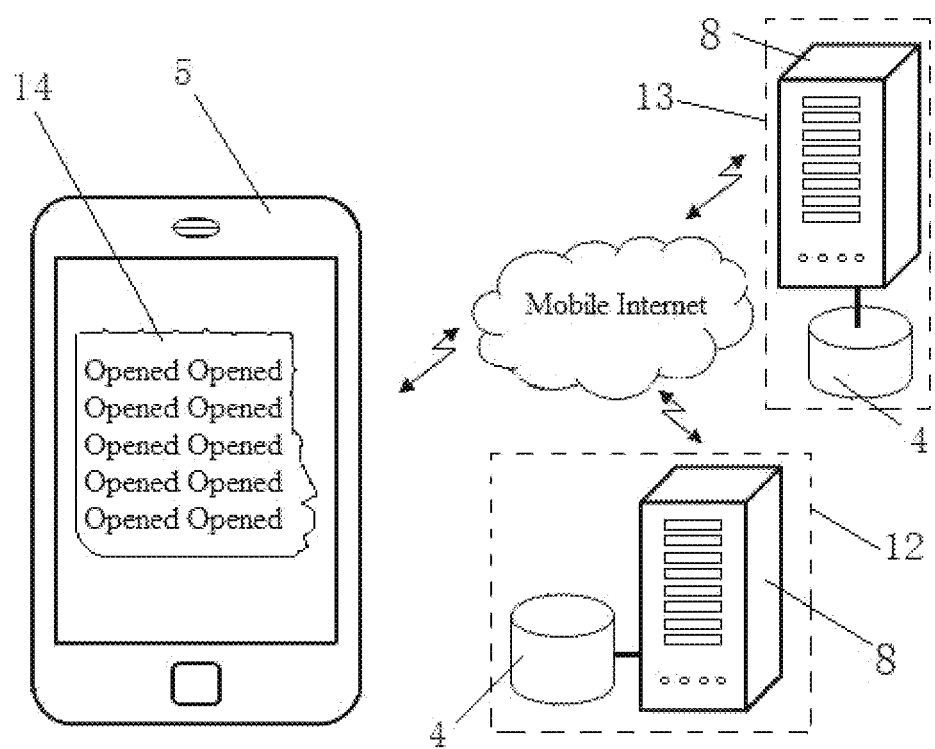
FIG. 16 is a schematic diagram of an insurance policy claim system according to an eighth embodiment of the present disclosure.

An insurance policy claim system as shown in FIG. 16 is established. The system may include two parts of an anti-counterfeiting identification sub-system (12) and an insurance policy registration sub-system (13).

The insurance policy content information (6) and the insurance policy number (10) are stored in one-to-one correspondence in the database (4) of the insurance policy claim system.

In this way, after purchasing the wine product, the consumer may turn on an NFC function of the smartphone (5) by using an APP for the wine product, move the smartphone (5) close to the RFID bottle cap, log in to the insurance policy claim system, read the insurance policy content information (6), fill in the identity information, and register identity information of the consumer as the insurance beneficiary.

Subjectively, the consumer actively reads the insurance policy content information (6) with the NFC function of the smartphone (5), and logs in to the insurance policy claim system. Objectively, the consumer unconsciously and passively performs authenticity identification on the insurance policy identifier by using the insurance policy claim system. In a case that the product is authentic, the insurance policy claim system may transmit the determined insurance policy content information (6) to the smartphone (5) of the claimant when or after transmitting the identification conclusion information (11) indicating that the product is authentic to the smartphone (5). As shown in FIG. 4, for example, the following information may be transmitted. The insurance company assures you that the product you purchased is authentic. You can perform a judicial evaluation on the product through other third-party institutions with a judicial evaluation qualification. In case of being determined as a counterfeit product after authenticity identification, you will receive an insurance compensation payment equal to three times the price of the product from the insurance company.

In a case that the product is authentic, the insurance policy claim system transmits a warning message (for example, a warning message of "the product you are checking is a counterfeit insurance policy/product") to the smartphone (5) to remind the claimant to beware of counterfeit.

In this way, in the case that the product is counterfeit, the claimant may obtain the insurance beneficiary as the insurance beneficiary.

Apparently, in a case that the consumer does not purchase the wine product, the consumer has no right to unscrew the bottle cap, thus the RFID insurance policy identifier (2) in the bottle cap is not to be damaged. Other consumers may claim the anti-counterfeiting liability electronic insurance policy (7) and fill in the insurance beneficiary, and then the insurance policy claim system may register the identity information of the purchaser as the insurance beneficiary.

To prevent a person from fraudulently claiming an insurance policy, the consumer may turn on an NFC function of the smartphone (5) on which a certain APP for the wine product is installed, move the smartphone (5) close to the RFID bottle cap to read information in the chip, logs in to the insurance policy claim system, and then upload damage evidence (14) information indicating that the insurance policy identifier (2) is damaged to the insurance policy claim system. After authenticity identification (for example, performing artificial intelligence identification/analysis/matching on an image/video) is performed, in a case that the damage evidence (14) information is matched and is uploaded for a first time, and the feature of the saw teeth is matched, the identity information provided by the claimant is registered as the insurance beneficiary according to the steps in the first and third embodiments described above. Thus, it is not allowed for anyone to modify the identity information of the insurance beneficiary again.

In another embodiment, the RFID insurance policy identifier (2) is arranged on a rubber cap of the bottle cap to be integrated with the rubber cap. The insurance policy number (10) is hidden between the rubber cap of the bottle cap and the bottle cap. After purchasing the product, the consumer turns on an NFC function of the smartphone (5) on which a certain APP for the wine product is installed, moves the smartphone (5) close to the RFID bottle cap to read the information in the chip, logs in to the insurance policy claim system, and then tears out the rubber cap (that is, damages the RFID), scans the exposed insurance policy number (10), and fills in the insurance beneficiary as claimant.

Eighth Embodiment

The anti-counterfeiting liability electronic insurance policy (7) is provided to protect rights and interests of consumers and prevent the consumers from being infringed by counterfeit products. Only after a product is purchased by the consumer, the consumer has the right to obtain the anti-counterfeiting liability electronic insurance policy (7) of the product. In order to prevent people who do not purchase the product from falsely claiming the anti-counterfeiting liability electronic insurance policy (7), to prevent people who have opportunity to come into contact with the product before the product is sold from falsely claiming the anti-counterfeiting liability electronic insurance policy (7), and to prevent a garbage collector who is not a real purchaser from falsely claiming the anti-counterfeiting liability electronic insurance policy (7), and ensure that only the purchaser has the right to claim the anti-counterfeiting liability electronic insurance policy (7), a design for easily damaging an appearance structure such as package and identifier is provided. With the design, the purchaser/consumer may damage the package with bare hands and without any other tools, obtain and upload damage evidence (14) information of the appearance, and thereby determine whether the product has been purchased by the consumer. The following rule should be followed in claiming the anti-counterfeiting liability electronic insurance policy (7). The product having damaged package and appearance is deemed to have been purchased by the consumer, and the claimant has a right to fill in the insurance beneficiary as the identity information of the claimant.

Preferably, an appearance structure damageable region (28) includes a damageable cut line (3) die-cut at a position of 0 to 12 mm away from the insurance policy number (10) on the product package (1) or the insurance policy identifier (2) to facilitate the consumer damaging the appearance by tearing out the damageable cut line (3) and uploading the damage evidence (14) information, a damageable pulling thread (9) embedded at the position of 0 to 12 mm away from the insurance policy number (10) on the product package (1) or the insurance policy identifier (2), to facilitate the consumer damaging the appearance by pulling up the pulling thread (9) and uploading damage evidence (14) information, an insurance policy number (10) printed at a position of 0 to 8 mm away from the mouth of the pop can to facilitate the consumer photographing and obtaining damage evidence (14) information such as the opened mouth of the pop can by using the smartphone (5), and an insurance policy number (10) printed at a position of 0 to 8 mm away from the straw socket (15) of the Tetra Pak to facilitate the consumer photographing and obtaining damage evidence (14) information such as a punctured straw socket (15) using a smartphone (5).

Figure 15:
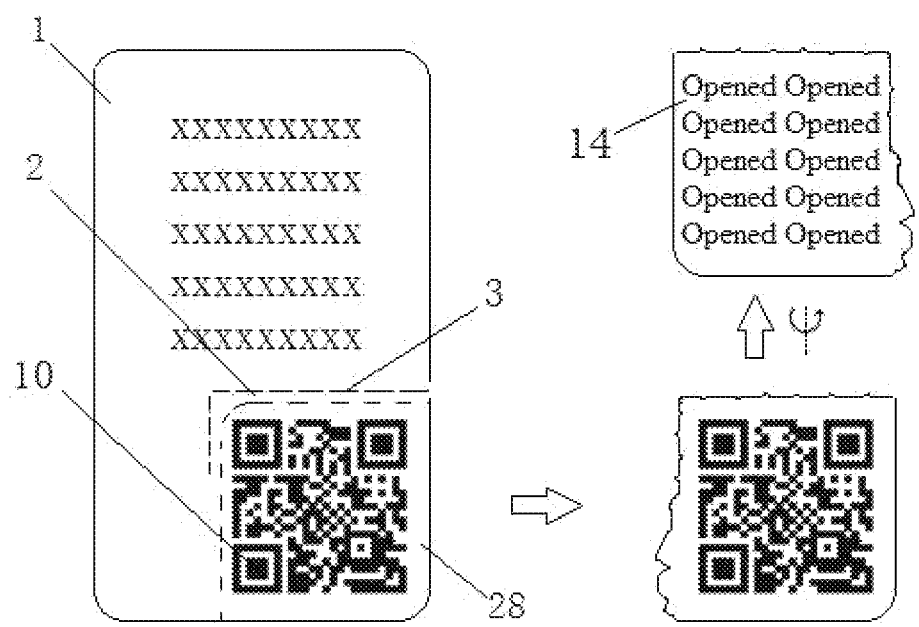
FIG. 15 is a schematic diagram of a damaged bottle label with an insurance policy number (10) configure in a form of two-dimensional code according to an eighth embodiment of the present disclosure.

As shown in FIGS. 15 and 16, a bottle label of a well-known brand of shampoo is printed on a piece of self-adhesive paper which is made of a non-transparent PE material. That is, a product package (1) is printed. On the back of the non-transparent PE material, some text of "opened" that are invisible from the front of the non-transparent PE material are printed in advance.

A unique insurance policy number (10) in the form of two-dimensional code is printed in a region at the lower right corner of the front of each bottle label, thus a bottle label of which the lower right corner is arranged with the insurance policy identifier (2). A damageable cut line (3) intermittently connected is die-cut along the insurance policy identifier (2) to facilitate the consumer tearing off the insurance policy identifier (2) at the lower right corner from the bottle label.

According to the Chinese patent of "MOBILE PHONE IDENTIFICATION CODE SAW-TOOTH ANTI-COUNTERFEITING METHOD (CN104794629B)", the insurance policy number (10) in the form of two-dimensional code is photographed in a macro mode to obtain individual feature information, such as the random saw teeth distributed along the edge of the two-dimensional code, and the individual feature information, such as the random saw teeth, is stored as the anti-counterfeiting information in the database (4).

The bottle label is pasted on the non-transparent shampoo bottle, so that the bottle label cannot be transferred to the counterfeit product without damage.

In this way, after purchasing the shampoo product, the consumer may tear up the insurance policy identifier (2) at the lower right corner according to prompt information. The consumer scans the two-dimensional code on the front of the shampoo product by using the WeChat scanning software installed on the smartphone (5), opens the WeChat applet, logs in to the insurance policy claim system, and then uploads the printed information such as the text of "opened" hidden in the insurance policy identifier (2) or in the product package (1) as damage evidence (14) information to the insurance policy claim system. After performing verification (for example, performing artificial intelligence identification/analysis/matching on an image/video), in a case that the damage evidence (14) information is completely matched and is uploaded for a first time, and the feature of the saw teeth feature is matched, the identity information provided by the claimant is registered as the insurance beneficiary according to the steps in the first and third embodiments described above. That is, the anti-counterfeiting liability electronic insurance policy (7) is provided to the qualified claimant for free.

Ninth Embodiment

Figure 17:
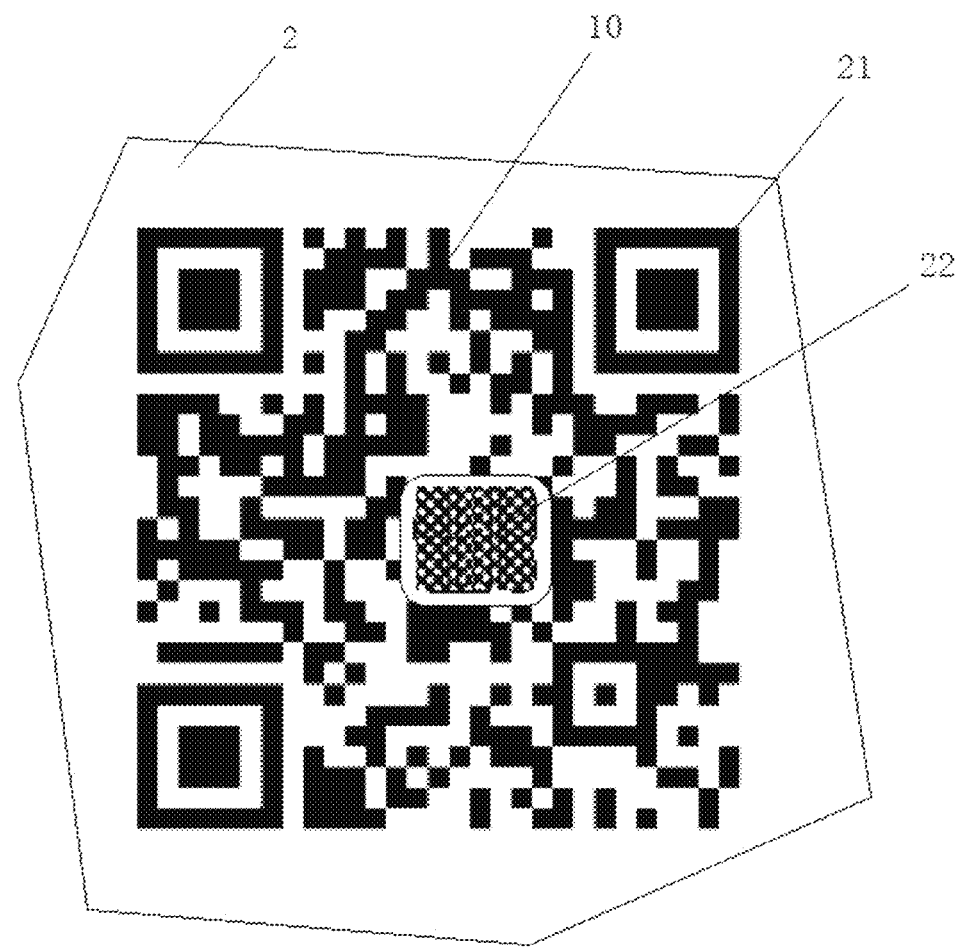
FIG. 17 is a schematic diagram of an insurance policy number (10) arranged with micropores according to a ninth embodiment of the present disclosure.

An insurance policy identifier (2) as shown in FIG. 17 is produced.

Each insurance policy identifier (2) is spray-printed with at least one unique insurance policy number (10) and graphic (22).

In step 1, a batch of unique insurance policy numbers (10) and graphics (22) are generated in advance in the computer. Some artificial micropores (19) with a diameter of 0.05 mm are arranged on an electronic image of each of the graphics (22), as shown in FIG. 9. The artificial micropores (19) are arranged in the graphic (22) at a center of the two-dimensional code.

In step 2, using liquid printing ink with a surface tension of Y, the insurance policy number (10) is printed on the insurance policy identifier (2), and the graphic (22) arranged with the artificial micropores (19) is printed on a printing surface with a surface energy of C, where Y is greater than C. For example, a local non-infiltration coating with a surface energy C greater than 28 dyne/cm is printed in advance, and then the graphic (22) is printed on the local non-infiltration coating by using liquid printing ink with a surface tension Y less than 48 dyne/cm. In short, the selected liquid ink should not infiltrate the selected printing surface, that is, the difference between C and Y should be large enough, and C should not be equal to or close to Y Thus, the artificial micropores (19) enclosed by the liquid ink expands and deforms randomly.

In step 3, after the graphic (22) is printed and is kept for 0.15 to 1.5 seconds for the artificial micropores (19) to naturally expand and randomly deform to form the saw-tooth micropores (20), the ink is dried and solidified. Diameters of some of the saw-tooth micropores (20) are to be expanded to 0.1 mm to 0.2 mm.

In step 4, in production, the saw-tooth micropores (20) are photographed in a magnification mode to obtain micro-feature information of the saw-tooth micropore (20). The micro-feature information includes at least one of a color, a shape, a size, an area, a perimeter, a position, a direction and the number of the saw-tooth micropores (20). The micro-feature information and the insurance policy number (10) information are stored in one-to-one correspondence in the database (4) of the insurance policy claim system as an anti-counterfeiting information file.

In step 5, when claiming the anti-counterfeiting liability electronic insurance policy (7), the consumer photographs the saw-tooth micropores (20) and the insurance policy number (10) on the insurance policy identifier (2) by using a smartphone (5) with a rear lens having a resolution equal to or greater than 5 million pixels to obtain the insurance policy number (10) information and the micro-feature information of the saw-tooth micropores (20), that is, the to-be-identified anti-counterfeiting information.

In step 6, the insurance policy claim system matches the obtained to-be-identified anti-counterfeiting information (especially the diameter and shape) with the anti-counterfeiting information file. In a case that the to-be-identified anti-counterfeiting information matches the anti-counterfeiting information file, identification conclusion information (11) indicating that the insurance policy identifier (2) is authentic is displayed on the smartphone (5). In a case that the to-be-identified anti-counterfeiting information does not match the anti-counterfeiting information file, identification conclusion information (11) indicating that the insurance policy identifier (2) is counterfeit is displayed on the smartphone (5).

Thus, after purchasing the product, the consumer may photograph the two-dimensional code and the damaged insurance policy identifier (2) to obtain damage evidence (14) information (for example, an image/short video) and insurance policy number (10) information, and upload the obtained damage evidence (14) information and insurance policy number (10) to the insurance policy claim system.

The insurance policy claim system receives and identifies the damage evidence (14) information and the insurance policy number (10) information.

The insurance policy claim system performs artificial intelligence image identification on the damage evidence (14) information. After it is determined that the insurance policy identifier (2) is damaged and the micro-character information of the saw-tooth micropores (20) matches the anti-counterfeiting information file, the provided identity information is registered as the insurance beneficiary according to the steps in the first and third embodiments described above. That is, the anti-counterfeiting liability electronic insurance policy (7) is provided to the claimant for free.

Tenth Embodiment

Figure 18:
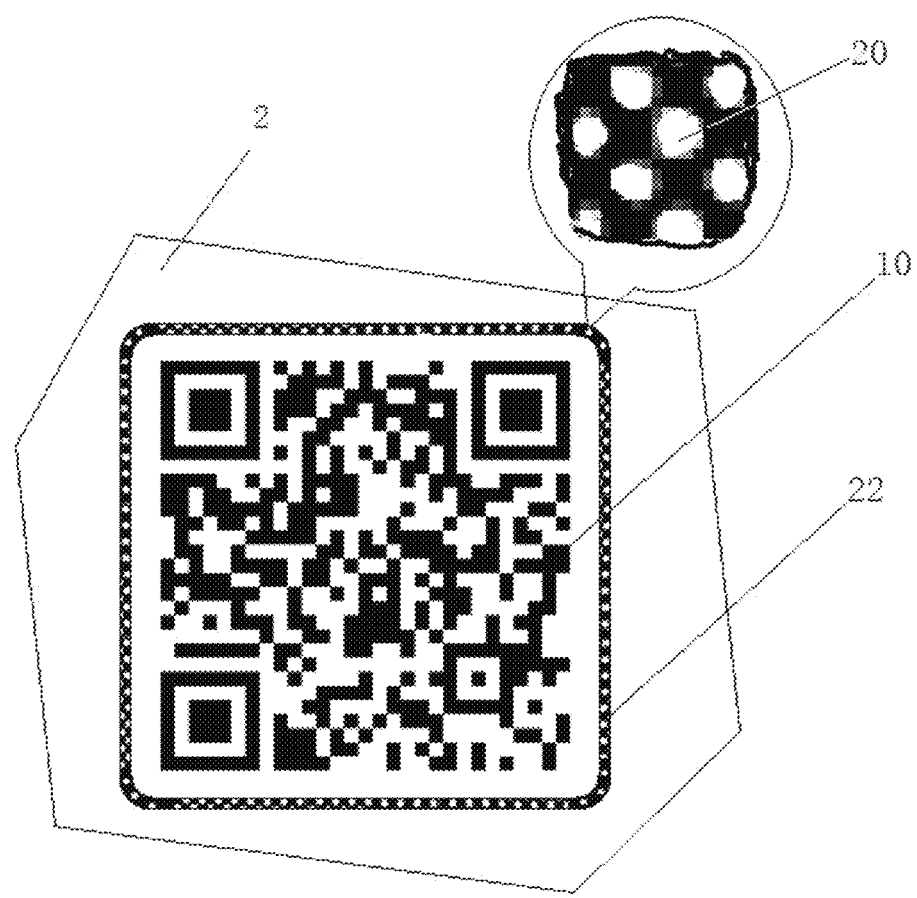
FIG. 18 is a schematic diagram of an insurance policy number (10) arranged with micropores according to a tenth embodiment of the present disclosure.

An insurance policy identifier (2) as shown in FIG. 18 is produced.

Each insurance policy identifier (2) is spray-printed with at least one unique insurance policy number (10) and a graphic (22) such as a frame.

In step 1, a batch of unique insurance policy numbers (10) and graphics (22) are generated in advance in the computer. Some artificial micropores (19) with a diameter of 0.15 mm are arranged on an electronic image of each of the graphics (22), as shown in FIG. 9. The artificial micropores (19) are arranged in the graphic (22), for example, in a frame of the two-dimensional code.

In step 2, using liquid printing ink with a surface tension of Y, the insurance policy number (10) is printed on the insurance policy identifier (2), and the graphic (22) arranged with the artificial micropores (19) is printed on a printing surface with a surface energy of C, where Y is less than C. For example, a local infiltration coating with a surface energy C greater than 48 dyne/cm is printed in advance, and then the graphic (22) is printed on the local infiltration coating by using liquid ink with a surface tension Y equal to 28 dyne/cm. In short, the selected liquid ink should infiltrate the selected printing surface, that is, the difference between C and Y should be large enough, and C should not equal to or close to Y Thus, the artificial micropores (19) enclosed by the liquid ink shrinks and deforms randomly.

In step 3, after the graphic (22) is printed and is kept for 0.15 to 1.5 seconds for the artificial micropores (19) to naturally shrink and randomly deform to form the saw-tooth micropores (20), the ink is dried and solidified. Diameters of some of the saw-tooth micropores (20) are to be shrunk to 0.03 mm to 0.1 mm.

In step 4, the saw-tooth micropores (20) are photographed in a magnification mode to obtain micro-feature information of the saw-tooth micropores (20). The micro-feature information includes at least one of a color, a shape, a size, an area, a perimeter, a position, a direction and the number of the saw-tooth micropores (20). The micro-feature information and the insurance policy number (10) information are stored in correspondence in the database (4) of the insurance policy claim system as the anti-counterfeiting information file.

In step 5, when claiming the anti-counterfeiting liability electronic insurance policy (7), the consumer photographs the saw-tooth micropores (20) and the insurance policy number (10) on the insurance policy identifier (2) by using a smartphone (5) with a rear lens having a resolution equal to or greater than 5 million pixels to obtain the insurance policy number (10) information and the micro-character information of the saw-tooth micropores (20), that is, the to-be-identified anti-counterfeiting information.

In step 6, the insurance policy claim system matches the obtained to-be-identified anti-counterfeiting information (especially the diameter and shape) with the anti-counterfeiting information file. In a case that the to-be-identified anti-counterfeiting information matches the anti-counterfeiting information file, identification conclusion information (11) indicating that the insurance policy identifier (2) is authentic is displayed on the smartphone (5). In a case that the to-be-identified anti-counterfeiting information does not match the anti-counterfeiting information file, identification conclusion information (11) indicating that the insurance policy identifier (2) is counterfeit is displayed on the smartphone (5).

Thus, after purchasing the product, the consumer may photograph the two-dimensional code and the damaged insurance policy identifier (2) to obtain damage evidence (14) information (for example, an image/short video) and insurance policy number (10) information, and upload the obtained damage evidence (14) information and insurance policy number (10) information to the insurance policy claim system.

The insurance policy claim system receives and identifies the damage evidence (14) information and the insurance policy number (10) information.

The insurance policy claim system performs artificial intelligence image identification on the damage evidence (14) information. After it is determined that the insurance policy identifier (2) is damaged and the micro-character information of the saw-tooth micropores (20) matches the anti-counterfeiting information file, the provided identity information is registered as the insurance beneficiary according to the steps in the first and third embodiments described above. That is, the anti-counterfeiting liability electronic insurance policy (7) is provided to the claimant for free.

Eleventh Embodiment

In step 1, technical operations, such as increasing a voltage at a nozzle, raising the nozzle, applying static electricity, and changing a frequency of a pulse signal, are performed to adjust the operation parameters of the inkjet printer to control the inkjet printer to operate in an abnormal operation state of flying ink.

Figure 19:
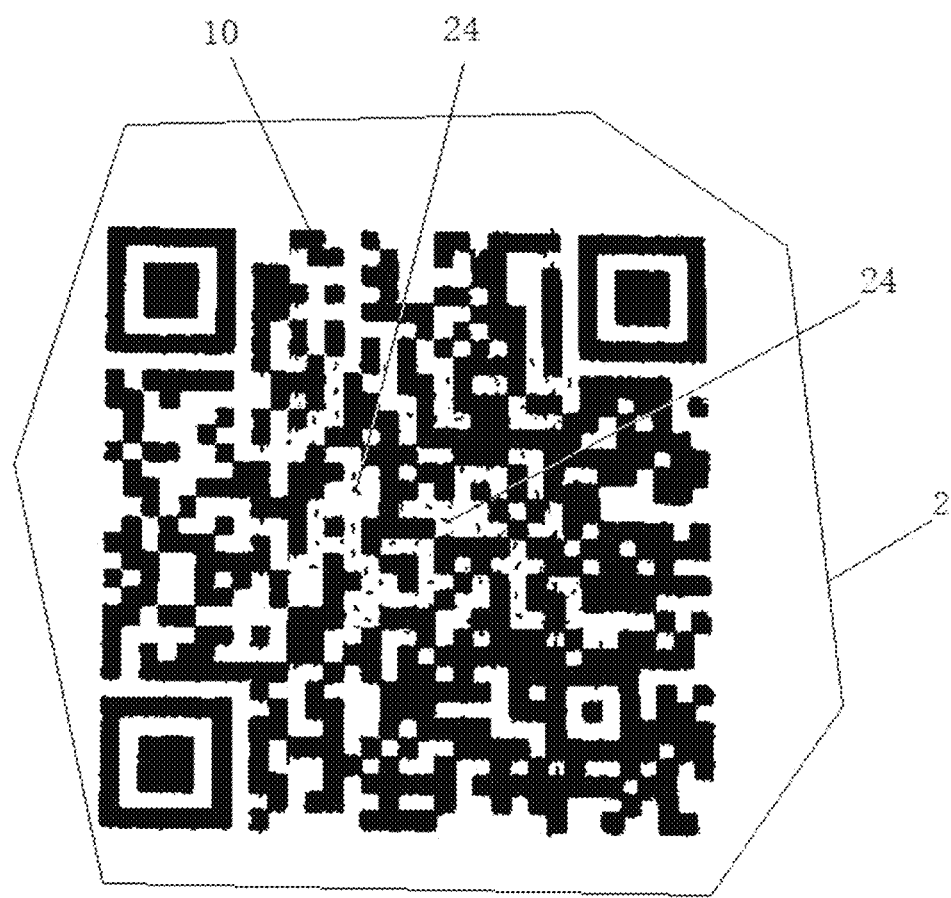
FIG. 19 is a schematic diagram of an insurance policy number (10) arranged with flying ink dots (24) according to an eleventh embodiment of the present disclosure.

The inkjet printer is controlled to operate in the an abnormal operation state of flying ink to print the insurance policy number (10) on the insurance policy identifier (2), thus flying ink dots (24) as shown in FIG. 19 are generated along with the printed insurance policy number (10).

The insurance policy number (10) may be a unique number, a unique letter, a one-dimensional code, or a two-dimensional code.

In step 2, the insurance policy number (10) and the flying ink dots (24) generated along with the printed insurance policy number (10) are photographed in a magnification mode (for example, a magnification of 30 times) using an industrial optical macro lens and a digital camera to obtain micro-feature information of the flying ink dots (24). The micro-feature information includes at least one of a color, a shape, a size, a position, a direction and the number of the flying ink dots (24). The micro-feature information as the anti-counterfeiting information and the insurance policy number (10) are stored in correspondence in the database (4) of the insurance policy claim system.

In step 3, when claiming an insurance policy, the consumer photographs the insurance policy number (10) and the flying ink dots (24) on the insurance policy identifier (2), at an object distance ranging from 20 mm to 80 mm, by using a smartphone (5) with a lens having a resolution equal to or greater than 12 million pixels to obtain the insurance policy number (10) information and the micro-character information, such as, shapes and sizes, of the flying ink dots (24), that is, the to-be-identified anti-counterfeiting information.

In step 4, the obtained insurance policy number (10) information and micro-feature information of the flying ink dots (24), that is, the to-be-identified anti-counterfeiting information, is uploaded to the computer anti-counterfeiting identification sub-system (12) to be matched with the anti-counterfeiting information file. In a case that the to-be-identified anti-counterfeiting information matches the anti-counterfeiting information file, identification conclusion information (11) indicating that the insurance policy identifier (2) is authentic is displayed on the smartphone (5). In a case that the to-be-determined anti-counterfeiting information does not match the anti-counterfeiting information file, identification conclusion information (11) indicating that the insurance policy identifier (2) is counterfeit is displayed on the smartphone (5).

Based on research, it shows that many flying ink dots (24) may be arranged to form a ghost of a line or a text stroke. In short, the flying ink may cause ghosting.

After purchasing a product, the consumer may scan the two-dimensional code on the product by using a WeChat scanning software installed on the smartphone (5) to open the WeChat applet, photograph the two-dimensional code and the damaged insurance policy identifier (2) by using the WeChat applet to obtain damage evidence (14) information (for example, an image/short video) and insurance policy number (10) information, and upload the obtained damage evidence (14) information and insurance policy number (10) information to the insurance policy claim system.

The insurance policy claim system receives and identifies the damage evidence (14) information and the insurance policy number (10) information.

The insurance policy claim system performs artificial intelligence image identification on the damage evidence (14) information. After it is determined that the insurance policy identifier (2) is damaged and the micro-character information of the saw-tooth micropores (20) matches the anti-counterfeiting information file, the provided identity information is registered as the insurance beneficiary according to the steps in the first and third embodiments described above. That is, the anti-counterfeiting liability electronic insurance policy (7) is provided to the qualified claimant for free.

Twelfth Embodiment

Figure 20:
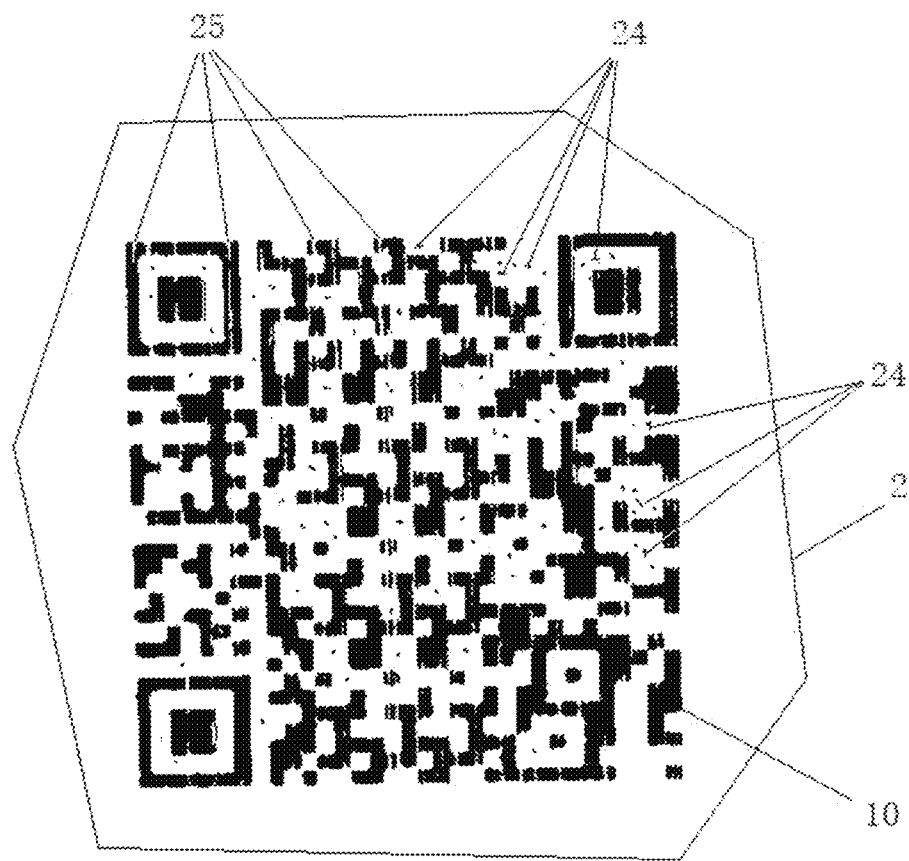
FIG. 20 is a schematic diagram of an insurance policy number (10) arranged with cracks (25) according to a twelfth embodiment of the present disclosure.

In step 1, the inkjet printer is controlled to operate in an abnormal operation state of flying ink by performing a technical operation of raising the nozzle. The nozzle is raised to a height of 2 mm to 3 mm from the insurance policy identifier (2). Then, the insurance policy number (10) is printed on the insurance policy identifier (2), flying ink dots (24) as shown in FIG. 19 are generated along with the printed insurance policy number (10), and numerous cracks (25) as shown in FIG. 20 are generated along with the printed insurance policy number (10).

In step 2, the insurance policy number (10), and the flying ink dots (24) and the cracks generated along with the printed insurance policy number (10) are photographed in a magnification mode (for example, a magnification of 30 times) using an industrial optical macro lens and a digital camera to obtain micro-feature information of the flying ink dots (24) and micro-feature of the cracks. The micro-feature information as the anti-counterfeiting information and the insurance policy number (10) are stored in correspondence in the database (4) of the insurance policy claim system.

In step 3, when claiming an insurance policy, the consumer photographs the insurance policy number (10), the flying ink dots (24) and the cracks (25) on the insurance policy identifier (2), at an object distance ranging from 20 mm to 80 mm, by using a smartphone (5) with a lens having a resolution equal to or greater than 12 million pixels to obtain the insurance policy number (10) information, the micro-feature information, such as shapes and sizes, of the flying ink dots (24) and the cracks (25), that is, the to-be-identified anti-counterfeiting information.

In step 4, the obtained insurance policy number (10) information, the micro-feature information of the flying ink dots (24) and the micro-character information of the cracks (25), that is, the to-be-identified anti-counterfeiting information, is uploaded to the anti-counterfeiting identification sub-system (12) to be matched with the anti-counterfeiting information file. In a case that the to-be-identified anti-counterfeiting information matches the anti-counterfeiting information file, identification conclusion information (11) indicating that the insurance policy identifier (2) is authentic is displayed on the smartphone (5). In a case that the to-be-identified anti-counterfeiting information does not match the anti-counterfeiting information file, identification conclusion information (11) indicating that the insurance policy identifier (2) is counterfeit is displayed on the smartphone (5).

The cracks (25) according to the present disclosure are commonly called as white marks, white tracks, white cracks, cracks, and the like.

Thus, after purchasing the product, the consumer may photograph the two-dimensional code on the product and the damaged insurance policy identifier (2) to obtain damage evidence (14) information (for example, an image/short video) and insurance policy number (10) information, and upload the obtained damage evidence (14) information and insurance policy number (10) information to the insurance policy claim system.

The insurance policy claim system receives and identifies the damage evidence (14) information and the insurance policy number (10) information.

The insurance policy claim system performs artificial intelligence image identification on the damage evidence (14) information. After it is determined that the insurance policy identifier (2) is damaged, the provided identity information is registered as the insurance beneficiary according to the steps in the first and third embodiments described above. That is, the anti-counterfeiting liability electronic insurance policy (7) is provided to the qualified claimant for free.

Thirteenth Embodiment

Figure 21:
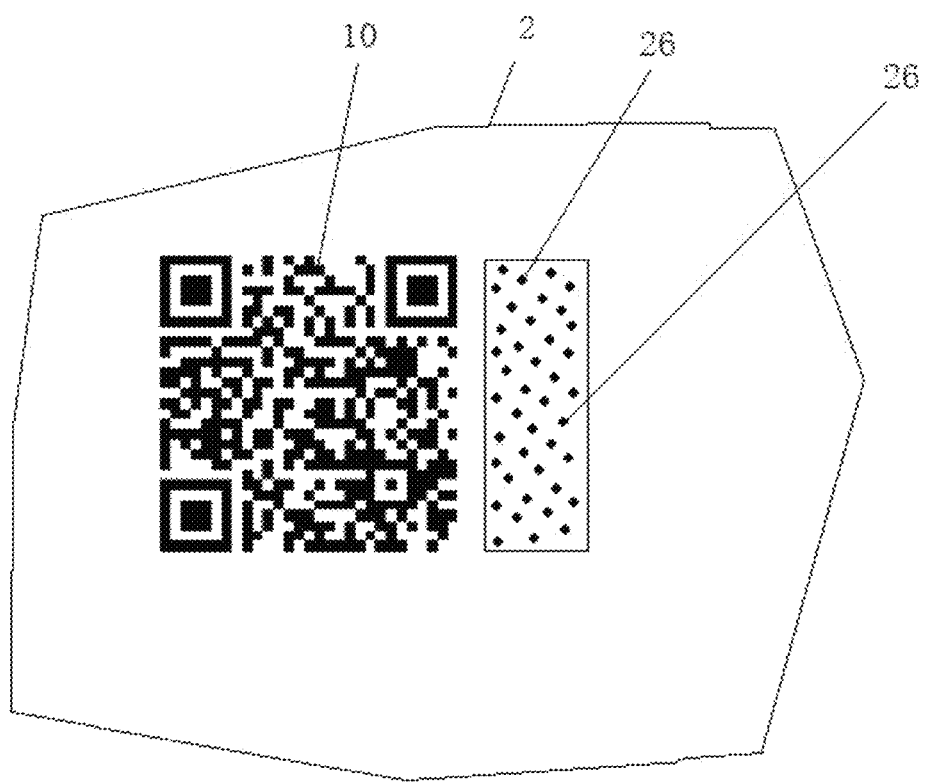
FIG. 21 is a schematic diagram of an insurance policy number (10) arranged with ink dots (26) according to a thirteenth embodiment of the present disclosure.

In step 1, as shown in FIG. 21, some ink dot (26) arrays, with a width (including a length) of 0.06 mm and formed by ink, are printed on the printing surface of the insurance policy identifier (2) having an infiltration feature relative to the ink. Each insurance policy identifier (2) is printed with a unique insurance policy number (10).

Figure 22:
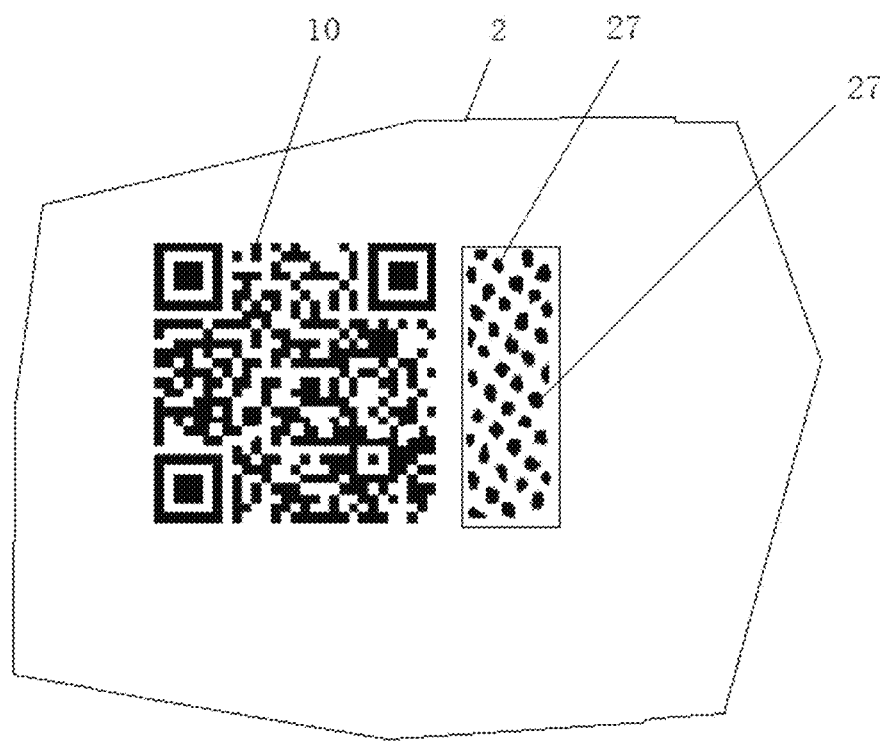
FIG. 22 is a schematic diagram of an insurance policy number (10) with which ink dots (26) arranged in FIG. 21 are transformed to infiltrating ink blocks.

In step 2, a diluent is added into the ink to reduce the surface tension of the ink, thus the ink dot (26) arrays are infiltrated randomly on the printing surface under an action of a wetting force to be deformed and expanded (as shown in FIG. 22) to form infiltrating ink block (27) arrays with random shape. Some infiltrated ink blocks (27) have a widths less than twice the width of the ink dot (26). The width of the ink dot (26) is less than the width of some infiltrating ink blocks (27), and the width of some infiltrating ink blocks (27) is less than twice the width of the ink dot (26).

In order to save the layout without changing the layout, the ink dots (26) may be arranged in local region in a printing ink layer of the insurance policy number (10), or the ink dots (26) may be arranged in blank gaps of the two-dimensional code. Thus, the ink dots (26) array does not occupy a certain space on the insurance policy identifier (2), not damaging the beauty of the original layout, and without modifying and approving.

To print the insurance policy identifier (2) on some non-infiltration printing materials, a local infiltration coating may be printed on the printing material in advance at the position where the ink dot (26) arrays is located, and the ink dot (26) arrays are printed on the local infiltration coating. The infiltration coating described above may be printed with a paint having a better infiltration effect than the ink. For example, a coating is obtained by printing white latex added with starch. In addition, materials, such as cotton powder, with which the surface tension of the infiltration coating may be increased to more than 48 dyne/cm may be added.

In a step 3, the infiltrating ink block (27) arrays are photographed in a magnification mode (for example, a magnification of 30 times) using an industrial optical macro lens and a digital camera to obtain micro-feature information, such as a shape and a size (for example, an area/width), of the infiltrating ink block (27). The micro-feature information, such as the shape and the size (for example, an area/width), as the anti-counterfeiting information and the insurance policy number (10) are stored in correspondence in the database (4) of the insurance policy claim system.

In step 4, when claiming an insurance policy, the consumer photographs the insurance policy number (10) and the infiltrating ink block (27) arrays on the insurance policy identifier (2), at an object distance ranging from 60 mm to 160 mm, by using a smartphone (5) with a lens having a resolution equal to or greater than 12 million pixels to obtain the insurance policy number (10) information and the micro-feature information, such as a shape and a size, of the infiltrating ink block (27).

In step 5, the micro-feature information, such as the shape and the size (for example, an area/width) of the infiltrating ink block (27) is uploaded to the insurance policy claim system to be matched with the anti-counterfeiting information file. In a case that the micro-feature information matches the anti-counterfeiting information file, identification conclusion information (11) indicating that the insurance policy identifier (2) is authentic is displayed on the smartphone (5). In a case that the micro-feature information does not match the anti-counterfeiting information file, identification conclusion information (11) indicating that the insurance policy identifier (2) is counterfeit is displayed on the smartphone (5).

Thus, after purchasing the product, the consumer may photograph the two-dimensional code and the damaged insurance policy identifier (2) to obtain damage evidence (14) information (for example, an image/short video) and insurance policy number (10) information, and upload the obtained damage evidence (14) information and insurance policy number (10) information to the insurance policy claim system.

The insurance policy claim system receives and identifies the damage evidence (14) information and the insurance policy number (10) information.

The insurance policy claim system performs artificial intelligence image identification on the damage evidence (14) information. After it is determined that the insurance policy identifier (2) is damaged, the provided identity information is registered as the insurance beneficiary according to the steps in the first and third embodiments described above. That is, the anti-counterfeiting liability electronic insurance policy (7) is provided to the qualified claimant for free.

Fourteenth Embodiment

Figure 23:
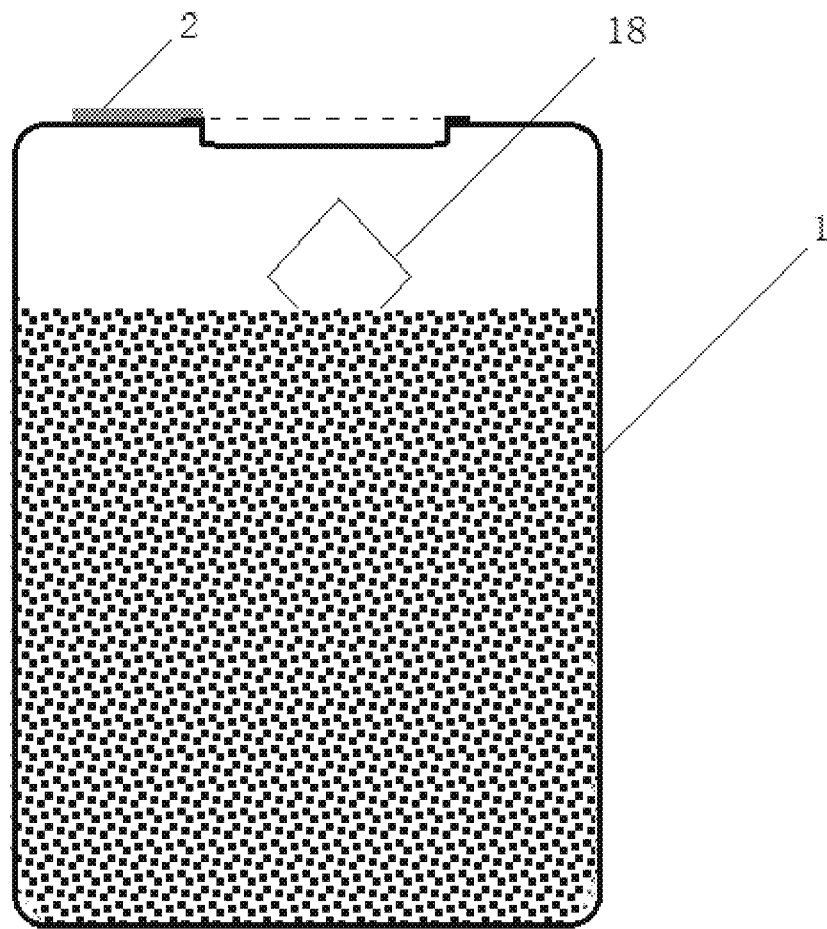
FIG. 23 is a schematic diagram of a milk powder product for which an insurance policy identifier (2) is pasted at a mouth of a milk powder tank and an anti-counterfeiting label (18) is arranged in the milk powder tank according to a fourteenth embodiment of the present disclosure.

As shown in FIG. 23, each anti-counterfeiting liability electronic insurance policy (7) is assigned a unique insurance policy number (10). The insurance policy number (10) in the form of two-dimensional code is printed on the insurance policy identifier (2) based on the anti-counterfeiting technology according to the Chinese patent of "MOBILE PHONE IDENTIFICATION CODE SAW-TOOTH ANTI-COUNTERFEITING METHOD (CN104794629B)". The two-dimensional code is photographed in a magnification mode to obtain saw teeth distributed randomly along the edge of the two-dimensional code. The obtained information of the saw teeth distributed randomly is stored and recorded as the anti-counterfeiting information in a database (4) of the anti-counterfeiting identification sub-system (12) as shown in FIG. 5.

Preferably, an anti-counterfeiting label (18) with anti-counterfeiting code (17) is made by using the over-limit anti-counterfeiting technology (CN106096970B) described in the background technology. Distribution feature and width information of villus on the anti-counterfeiting label (18) are obtained and then stored as the anti-counterfeiting information in the database (4). The anti-counterfeiting label (18) is placed in a milk powder tank. Then, the insurance policy identifier (2) is used as a sealing sticker to seal the filling of the milk powder tank. Preferably, the anti-counterfeiting code (17) and the insurance policy number (10) are stored in one-to-one correspondence in the database (4) of the insurance policy claim system.

An insurance policy claim system as shown in FIG. 5 is established. The system may include two parts of an anti-counterfeiting identification sub-system (12) and an insurance policy registration sub-system (13).

The insurance policy content information (6) of the anti-counterfeiting liability electronic insurance policy (7), the anti-counterfeiting information of the insurance policy identifier (2), the insurance policy number (10), the anti-counterfeiting code (17), and the distribution feature of the villus are stored in correspondence in the database (4) of the insurance policy claim system.

In this way, before purchasing the milk power product, the consumer may scan the two-dimensional code of the insurance policy number (10) using the smartphone (5) to perform authenticity identification (a first authenticity identification, which is simple and fast, however, the identification conclusion is inaccurate) on the product based on the insurance policy claim system, and obtain the insurance policy content information (6) to enhance purchase confidence. Preferably, while receiving the insurance policy content information (6), the consumer may be prompted to open the milk power tank to find the anti-counterfeiting label (18) and scan the two-dimensional code to obtain the insurance policy.

After purchasing the milk power product and before eating the milk power, the customer may remove the sealing sticker, that is the insurance policy identifier (2), lift the lid of the milk tank (that is, damage the package), take out the anti-counterfeiting label (18) from the milk powder tank, and photograph the two-dimensional code on the anti-counterfeiting label (18) using the smartphone (5) in a macro mode (ensuring that a resolution greater than 1600 dpi*1600 dpi), perform authenticity identification on the distribution feature and the width information of villus based on the insurance policy claim system to identify authenticity. After authenticity identification (a second authenticity identification, which is complex and time-consuming, however, the identification conclusion is accurate), in a case that the anti-counterfeiting label (18) is determined to be authentic by the insurance policy claim system and the insurance policy is claimed for a first time, the insurance policy claim system registers the identity information provided by the claimant as the insurance beneficiary.

Fifteenth Embodiment

Figure 24:
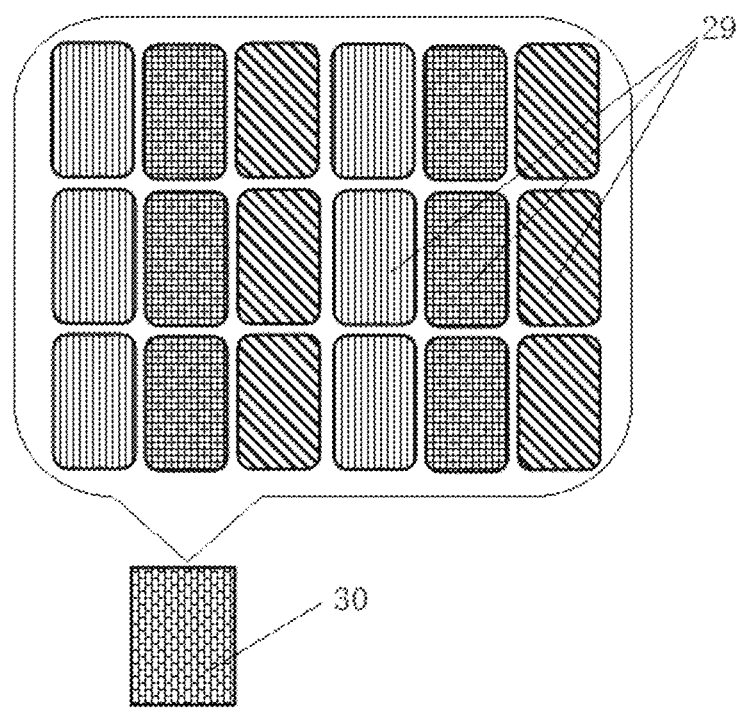
FIG. 24 is a schematic diagram showing an enlargement effect of a conventional display screen (30) according to a fifteenth embodiment of the present disclosure.
Figure 25:
FIG. 25 is a schematic diagram showing an enlargement effect of a conventional display screen (30) according to a fifteenth embodiment of the present disclosure.

As shown in FIGS. 24 and 25, a magnification color rendering feature, that is, screen (30) feature information, such as pixel array (29) based on three-primary colors of red, green and blue, of a display screen (30) is stored and recorded as counterfeit feature information (that is, anti-counterfeiting information) in the database (4) of the insurance policy claim system. That is, the screen (30) feature information includes but not limited to the feature information of the pixel array based on three-primary colors of red, green and blue, and the screen (30) feature information is stored and recorded as the counterfeit feature information (that is, the anti-counterfeiting information) in the database (4) of the insurance policy claim.

Thus, the claimant may photograph the damaged appearance of the product using the smartphone (5) in a macro mode, the obtained and uploaded damage evidence (14) information includes the screen (30) feature information, such as the pixel array (29) based on three-primary colors of red, green and blue. The insurance policy claim system transmits a warning message to the smartphone (5) of the claimant to remind the claimant to beware of counterfeit and refuse the claimant to claim the anti-counterfeiting liability electronic insurance policy (7).

The reason is that, based on the research, the microscopic image/video, captured by using the smartphone (5) in a macro mode, of an object such as the insurance policy identifier (2) and the anti-counterfeiting label (18) does not contain the pixel array (29) based on three primary colors of red, green and blue, and the microscopic image/video is obviously different from a re-photographed screen (30) image. Therefore, with the method described above, the claimant is prevented from re-photographing an image (not an actual insurance policy identifier (2) or anti-counterfeiting label (18)) of the insurance policy identifier (2) or the anti-counterfeiting label (18) displayed on a mobile phone screen (30) or on a computer screen (30) or on other displays to forge damage evidence (14) information to falsely claim an anti-counterfeiting liability electronic insurance policy (7) and defraud an insurance claim.

Preferably, the claimant may install a mobile phone program (for example, a policy claim APP or a policy claim WeChat applet) on the smart phone (5), then photograph the damaged appearance of the product using the smartphone (5) to obtain the damage evidence (14) information, and upload the obtained damage evidence (14) information to the insurance policy claim system. Images/videos included in an album of the smartphone (5) are forbidden to be added and used by the smartphone application. Thus, the claimant is prevented from adding and using the forged damage evidence (14) information such as the image/video in the album of the smartphone (5), and thereby the claimant is prevented from falsely claiming the anti-counterfeiting liability electronic insurance policy (7) to defraud the insurance claim.

Sixteenth Embodiment

The first authenticity identification on the insurance policy identifier (2) is performed in a case that the consumer is shopping in the mall. In this case, there are many people waiting in line and time is limited, thus it required to identify authenticity or claim the insurance policy simply and quickly (for example, within 5 seconds). Therefore, the first authenticity identification conclusion may be inaccurate. In addition, it is required to perform the first authenticity identification simply and quickly (for example, within 5 seconds), thus the first authenticity identification is performed by using a WeChat applet, and the resolution of the scanned anti-counterfeiting information on the insurance policy identifier (2) by a WeChat applet used is low (for example, less than 300 dpi×300 dpi), resulting in an inaccurate identification conclusion for the first authenticity identification.

Figure 26:
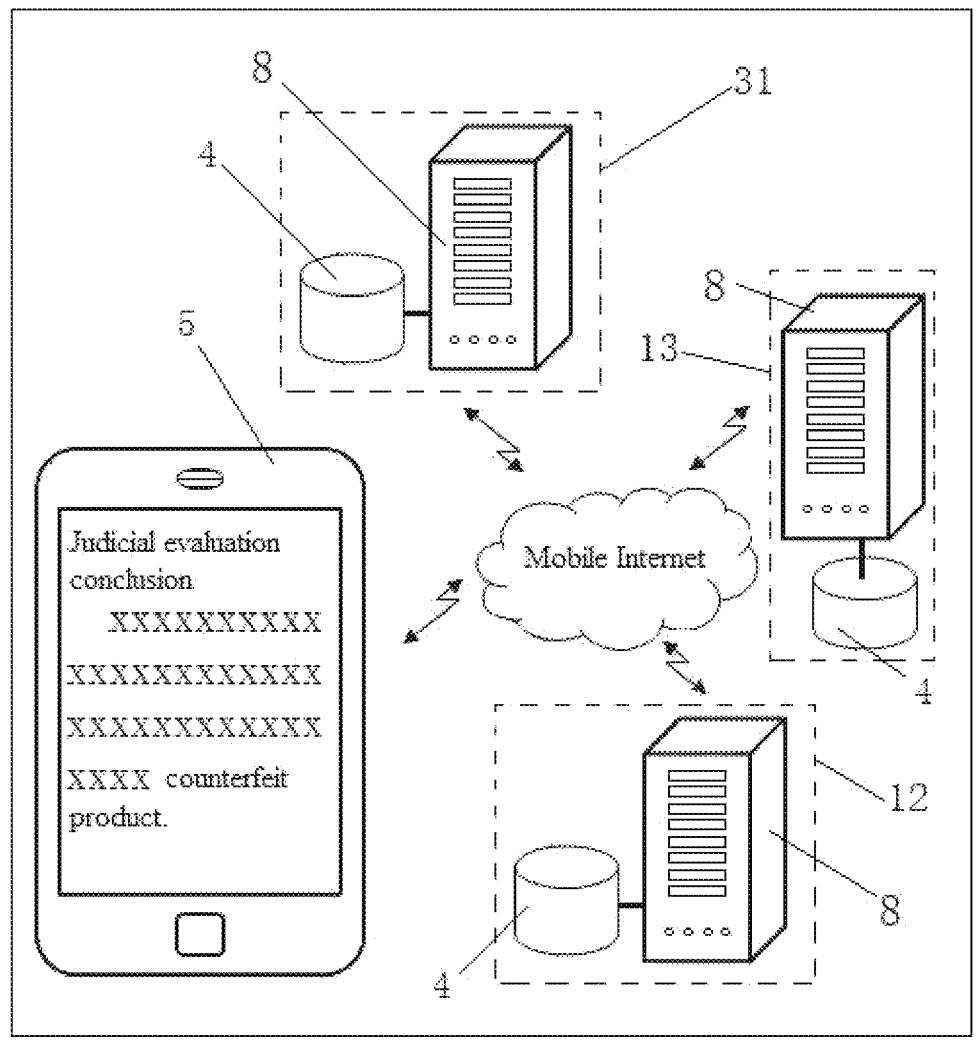
FIG. 26 is a schematic diagram of an insurance policy claim system including a re-identification system (31) according to a sixteenth embodiment of the present disclosure.

Preferably, to make up for the inaccuracy of the identification conclusion for the first authenticity identification, as shown in FIG. 26, in a case that being relatively idle, the consumer may photograph the anti-counterfeiting information on the insurance policy identifier (2) using the smartphone (5) in a macro mode or scan the anti-counterfeiting information on the insurance policy identifier (2) using a high-definition scanner, upload (for example, through a multimedia messaging service or an email) the obtained high-resolution (for example, a resolution greater than 1200 dpi×1200 dpi) anti-counterfeiting information and the damage evidence (14) to a re-identification system (31) that is operated by an independent third party to re-identify (for example, performing AI identification and manual identification) the insurance policy identifier (2). After re-identification (for example, it takes 30 minutes to three hours), the insurance policy identifier (2) indicated as an authentic insurance policy identifier (2) by the identification conclusion information (11) transmitted by the insurance policy claim system is determined as a counterfeit authentic insurance policy identifier (2), a re-conclusion (which may be used as a judicial identification conclusion) is transmitted to the smartphone (5), and an insurance claim process is started to provide the insurance claim for the claimant.

The damage evidence (14) information is also uploaded to the re-identification system (31) that is operated by an independent third party to prevent people who do not purchase the product from performing re-identification, and to ensure that only the consumer who purchases the product and obtain the damage evidence (14) information has the right to perform re-identification, avoiding the occurrence of fraudulent insurance that knows and buys fakes.

The re-identification system (31) is operated independently by a third party, thus the re-identification system (31) has strong credibility, and the re-identification conclusion may be used as the judicial evaluation conclusion and may be used as a legal basis for the consumer to obtain the insurance claim.

The embodiments disclosed above are only preferred embodiments of the present disclosure, and are not intended to limit the scope of the claims of the present disclosure. Therefore, any equivalent changes according to the claims of the present disclosure should fall within the protection scope of the present disclosure.

The invention claimed is:

1. A method for packaging a product with anti-counterfeiting liability insurance, comprising:
   (1) providing the product with an anti-counterfeiting liability electronic insurance policy (7);
   (2) assigning an insurance policy number to the anti-counterfeiting liability electronic insurance policy (7), wherein an anti-counterfeiting liability electronic insurance policy (7) is assigned with at least one unique insurance policy number (10);

(3) arranging the insurance policy number (10) and anti-counterfeiting information on an insurance policy identifier (2), or arranging an anti-counterfeiting code (17), corresponding to the insurance policy number (10), and anti-counterfeiting information on the insurance policy identifier (2);

(4) packaging the product in a product package (1), and arranging the insurance policy identifier (2) on the product package (1), wherein the product is arranged with at least one insurance policy identifier (2), and the anti-counterfeiting liability electronic insurance policy (7) is associated with the product by using the insurance policy identifier (2);

(5) integrating the insurance policy identifier (2) and the product package (1) into an inseparable whole to control the insurance policy identifier (2) not to be transferred to another product without damage;

(6) storing the anti-counterfeiting liability electronic insurance policy (7), the anti-counterfeiting information, and the insurance policy number (10)/anti-counterfeiting code (17) in correspondence in a database (4) of an insurance policy claim system as filing information;

(7) uploading, by a claimant using a smartphone (5), an insurance policy number (10)/anti-counterfeiting code (17) and anti-counterfeiting information to the insurance policy claim system;

after performing authenticity identification, in a case that the uploaded insurance policy number (10)/anti-counterfeiting code (17) and anti-counterfeiting information match the filing information stored in the database (4), and the insurance policy claim system determines that the insurance policy identifier (2) is authentic, transmitting, by the insurance policy claim system, identification conclusion information (11) indicating that the insurance policy identifier (2) is authentic to the smartphone (5) of the claimant; and after performing authenticity identification, in a case that the uploaded insurance policy number (10)/anti-counterfeiting code (17) and anti-counterfeiting information does not match the filing information stored in the database (4), and the insurance policy claim system determines that the insurance policy identifier (2) is counterfeit, transmitting, by the insurance policy claim system, a warning message to the smartphone (5) to remind the claimant to beware of a counterfeit product; and (8) transmitting, by the insurance policy claim system, the anti-counterfeiting liability electronic insurance policy (7) corresponding to the determined insurance policy identifier (2) to the smartphone (5).

2. The method for packaging a product with anti-counterfeiting liability insurance according to claim 1, comprising: arranging an appearance structure damageable region (28) on the product package (1) or the insurance policy identifier (2).

3. The method for packaging a product with anti-counterfeiting liability insurance according to claim 1, comprising at least one of the following steps:

(1) uploading damage evidence (14) information indicating that the appearance structure damageable region (28) is damaged to the insurance policy claim system by using the smartphone (5);

(2) after the insurance policy claim system determines that a RFID insurance policy identifier (2) is authentic, registering, by the insurance policy claim system, identity information provided by the claimant as an insurance beneficiary;

(3) providing/confirming, by the claimant, the identity information to the insurance policy claim system to claim the anti-counterfeiting liability electronic insurance policy (7);

(4) placing a printed anti-counterfeiting liability electronic insurance policy (7) on which the insurance policy number (10) is printed in the product package (1), arranging the RFID insurance policy identifier (2) on the product package (1), and writing the insurance policy number (10) of the product in a RFID of the insurance policy identifier (2) on the product to control the insurance policy number (10) printed on the printed anti-counterfeiting liability electronic insurance policy (7) to be same as or in one-to-one correspondence with the insurance policy number (10) written in a RFID chip;

(5) pasting the RFID insurance policy identifier (2) and a rubber cap in a bottle cap together to hide the insurance policy number (10) between the rubber cap and the bottle cap, wherein after a consumer purchasing the product, the consumer turns on an NFC function of the smartphone (5), moves the smartphone (5) close to a RFID bottle cap to obtain information stored in the chip, logs in to the insurance policy claim system, removes the rubber cap to damage the RFID, scans the exposed insurance policy number (10) using the smartphone (5), and fills in the insurance beneficiary as the consumer;

(6) capturing, by the claimant using the smartphone (5), the insurance policy number (10) and the anti-counterfeiting information, and uploading, by the claimant, the captured insurance policy number (10) and anti-counterfeiting information to the insurance claim system to be stored as a history file in the database (4) of the insurance policy claim system for an insurance claim review or a judicial evaluation;

(7) transmitting, by the insurance policy claim system, insurance policy content information (6) of the anti-counterfeiting liability electronic insurance policy (7) corresponding to the insurance policy identifier (2) to the smartphone (5), wherein the insurance policy content information (6) comprises but not limited to the insurance policy number (10); and (8) arranging the appearance structure damageable region (28) on the product package (1) or the insurance policy identifier (2), wherein the appearance structure damageable region (28) comprises but not limited to a damageable cut line (3) die-cut at a position of 0 to 12 mm away from the insurance policy number (10) on the product package (1) or the insurance policy identifier (2), a damageable pulling thread (9) embedded at a position of 0 to 12 mm away from the insurance policy number (10) on the product package (1) or the insurance policy identifier (2), an insurance policy number (10) printed at a position of 0 to 8 mm away from a mouth of a pop can, and an insurance policy number (10) printed at a position of 0 to 8 mm away from a straw socket (15) of a Tetra Pak.

4. The method for packaging a product with anti-counterfeiting liability insurance according to claim 3, comprising one of the following steps:

(1) capturing, by the claimant using the smartphone (5), a damaged appearance of the product to obtain the damage evidence (14) information; uploading, by the claimant using the smartphone (5), the obtained damage evidence (14) information in a form of an image/video to the insurance policy claim system to be stored in the insurance policy claim system; activating, by the insurance policy claim system, identity information of the insurance beneficiary of the anti-counterfeiting liability electronic insurance policy (7) after the insurance policy claim system determines that the appearance of the product is damaged by performing analysis and comparison on the image/video;

(2) arranging the appearance structure damageable region (28) on the product package (1) or the insurance policy identifier (2); damaging, by the clamant, the appearance structure damageable region (28) with bare hands; and uploading, by the clamant using the smartphone (5), the damage evidence (14) information indicating that the appearance structure damageable region (28) is damaged to the insurance policy claim system;

(3) storing screen (30) feature information comprising but not limited to feature information of a pixel array (29) based on three primary colors of red, green and blue as counterfeit feature information in the database (4) of the insurance policy claim system; photographing, by the claimant using the smartphone (5), the damaged appearance of the product in a macro mode to obtain the damage evidence (14) information; uploading the obtained damage evidence (14) information in a form of a micro image/video to the insurance policy claim system; performing, by the insurance policy claim system, analysis and comparison on the micro image/video; in a case that the insurance policy claim system determines that the uploaded micro image/video comprises the screen (30) feature information, transmitting, by the insurance policy claim system, the warning message to the smartphone (5) to remind the claimant to beware of the counterfeit product, and refusing, by the insurance policy claim system, the claimant to claim the anti-counterfeiting liability electronic insurance policy (7);

(4) photographing, by the claimant using the smartphone (5), the damaged appearance of the product to obtain the damage evidence (14) information; and uploading the obtained damage evidence (14) information to the insurance policy claim system, wherein images/videos comprised in an album of the smartphone (5) are forbidden to be added and used; and (5) transmitting the anti-counterfeiting information to a re-identification system (31) to perform re-identification on the insurance policy identifier (2); after re-identification, in a case that the insurance policy identifier (2) indicated as an authentic insurance policy identifier (2) by the identification conclusion information (11) transmitted by the insurance policy claim system is determined as a counterfeit authentic insurance policy identifier (2), transmitting a re-identification conclusion as a final identification conclusion to the smartphone (5).

5. The method for packaging a product with anti-counterfeiting liability insurance according to claim 3, comprising:

making an anti-counterfeiting label (18) with the anti-counterfeiting code (17); arranging the anti-counterfeiting label (18) in the product package (1); storing the anti-counterfeiting code (17) and the insurance policy number (10) in one-to-one correspondence in the database (4) of the insurance policy claim system; after opening the product package (1) and finding the anti-counterfeiting label (18), photographing, by the clamant using the smartphone (5), anti-counterfeiting information on the anti-counterfeiting label (18) in the macro mode, or scanning, by the clamant using a high-definition scanner, the anti-counterfeiting information on the anti-counterfeiting label (18); uploading the anti-counterfeiting information having a high resolution to the database (4) of the insurance policy claim system for anti-counterfeiting identification to perform a second authenticity identification on the product; and in a case that the insurance policy claim system determines that the anti-counterfeiting label (18) is authentic by performing the second authenticity identification, registering, by the insurance policy claim system, the provided identity information as the insurance beneficiary.

6. The method for packaging a product with anti-counterfeiting liability insurance according to claim 3, comprising:

in a case that the insurance policy claim system determines that the insurance policy identifier (2) is authentic, paying, by the applicant, insurance premiums online to purchase an insurance, and registering, by the insurance policy claim system, the identity information provided by the claimant as the insurance beneficiary.

7. The method for packaging a product with anti-counterfeiting liability insurance according to claim 3, comprising:

(1) arranging artificial micropores (19) on the insurance policy number (10);

(2) after printed artificial micropores (19) naturally shrink/expand to form random-shaped saw-tooth micropores (20), drying and solidifying ink to shape the saw-tooth micropores (20), wherein diameters of some saw-tooth micropores (20) range from 0.01 mm to 0.05 mm or from 0.01 mm to 0.03 mm; and (3) photographing the saw-tooth micropores (20) in a magnification mode to obtain micro-feature information of the saw-tooth micropores (20), and storing the obtained micro-feature information as the anti-counterfeiting information in the database (4) of the insurance policy claim system.

8. The method for packaging a product with anti-counterfeiting liability insurance according to claim 7, comprising:

after the insurance policy number (10) is printed, drying and solidifying the ink after a delay of 0.15 seconds to 1.5 seconds for the artificial micropores (19) to fully shrink/expand and randomly deform.

9. The method for packaging a product with anti-counterfeiting liability insurance according to claim 7, comprising:

arranging the saw-tooth micropores (20) in a position detection diagram (21) of a two-dimensional code, or arranging the saw-tooth micropores (20) in a graphic (22) at a center of the two-dimensional code, or arranging the saw-tooth micropores (20) in a graphic (22) beside the two-dimensional code.

10. The method for packaging a product with anti-counterfeiting liability insurance according to claim 9, wherein shapes of the artificial micropores (19) comprises one or more of a circle, a square, a triangle and a polygon, and diameters of the artificial micropores (19) range from 0.06 mm to 0.36 mm or from 0.13 mm to 0.17 mm.

11. The method for packaging a product with anti-counterfeiting liability insurance according to claim 7, comprising:

matching areas/perimeters of the saw-tooth micropores (20) with the anti-counterfeiting information stored in the database (4).

12. The method for packaging a product with anti-counterfeiting liability insurance according to claim 3, comprising:
   (1) adjusting an operation parameter of an inkjet printer to control the inkjet printer to operate in an abnormal operation state of flying ink in printing the insurance policy number (10) on the insurance policy identifier (2);
   (2) controlling the inkjet printer to operate in the abnormal operation state of flying ink to print the insurance policy number (10) on the insurance policy identifier (2) to generate flying ink dots (24) along with the printed insurance policy number (10); and
   (3) photographing the flying ink dots (24) in the magnification mode to obtain micro-feature information of the flying ink dots (24), and storing the obtained micro-feature information as the anti-counterfeiting information in the database (4) of the insurance policy claim system, wherein the micro-feature information comprises at least one of a color, a shape, a size, a position, a direction, and the number of the flying ink dots (24).

13. The method for packaging a product with anti-counterfeiting liability insurance according to claim 12, wherein diameters of some of the flying ink dots (24) are less than or equal to 0.05 mm, 0.04 mm, 0.03 mm, 0.02 mm or 0.01 mm.

14. The method for packaging a product with anti-counterfeiting liability insurance according to claim 12, wherein cracks are generated along with the printed insurance policy number (10).

15. The method for packaging a product with anti-counterfeiting liability insurance according to claim 12, comprising:
raising a nozzle to a distance of 1.6 mm to 3.6 mm from the insurance policy identifier (2).

16. The method for packaging a product with anti-counterfeiting liability insurance according to claim 1, comprising:
   (1) printing ink dot (26) arrays on a printing surface of the insurance policy identifier (2) with ink, wherein the printing surface has wettability relative to the ink;
   (2) randomly moistening the ink dot (26) arrays on the printing surface under an action of a wetting force to form infiltrating ink block (27) arrays with random shapes; and
   (3) photographing the infiltrating ink block (27) arrays in a magnification mode to obtain micro-feature information of an infiltrating ink block (27), and storing the obtained micro-feature information as the anti-counterfeiting information in the database (4) of the insurance policy claim system, wherein the micro-feature information comprises a color, a shape, a size, a position, a direction and the number of the infiltrating ink block (27).

17. The method for packaging a product with anti-counterfeiting liability insurance according to claim 16, wherein a quotient obtained by dividing a width of the infiltrating ink block (27) by a width of a ink dot (26) ranges from 1.2 to 1.8; at least an array comprising 10 or 100 or 1000 or 3000 or 10000 ink dots (26) is printed on one insurance policy identifier (2); and the insurance policy claim system matches an average width, an average area, depths of colors, positions, or directions of infiltrating ink blocks (27) formed based on the ink dots (26) with an anti-counterfeiting information file to identify authenticity.

\* \* \* \* \*